Sept. 2, 1969 R. BRABON ET AL 3,465,097
SUBTITLING SYSTEM FOR TELEVISION PROGRAMS
Filed Sept. 6, 1966 20 Sheets-Sheet 1

*INVENTORS*
Roger BRABON
Andre BEAUMARIAGE
Roland DE BROYER
Willy DE BOECK
Firmin DELPLANCKE
Marcel VAN INNIS

*ATTORNEY*

INVENTORS
Roger BRABON
Andre BEAUMARIAGE
Roland DE BROEYER
Willy DE BOECK
Firmin DELPLANCKE
Marcel VAN INNIS INVENTORS
Roger BRABON
Andre BEAUMARIAGE
Roland DE BROYER
Willy DE BOECK
Firmin DELPLANCKE
Marcel VAN INNIS

ATTORNEY

INVENTORS
Roger BRABON
André BEAUMARIAGE
Roland DE BROYER
Willy DE BOECK
Firmin DELPLANCKE
Marcel VAN INNIS

ATTORNEY

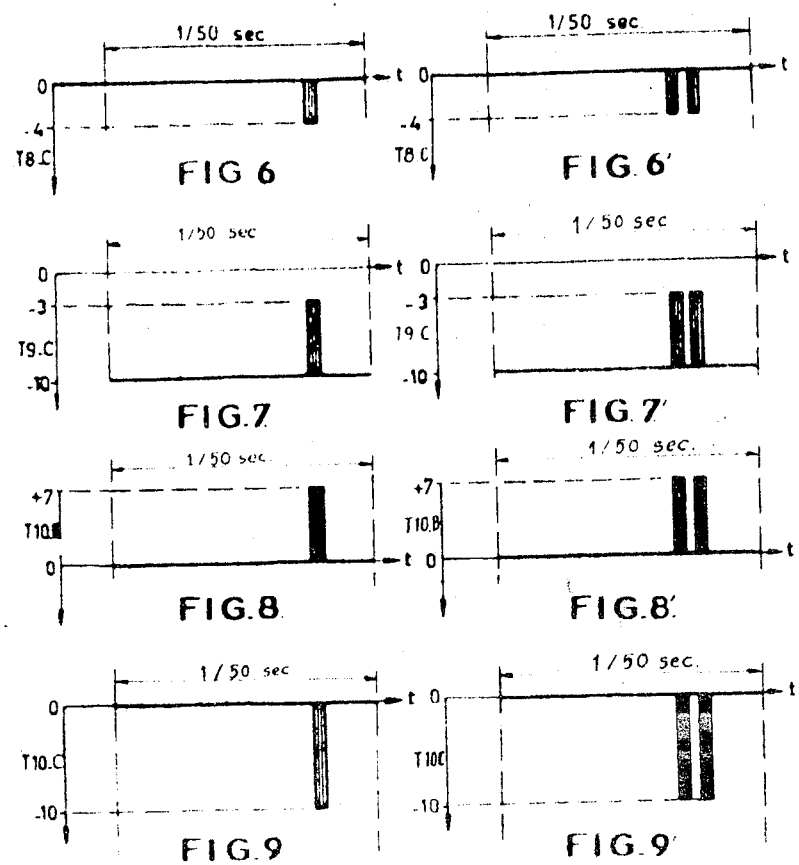

Sept. 2, 1969  R. BRABON ET AL  3,465,097
SUBTITLING SYSTEM FOR TELEVISION PROGRAMS
Filed Sept. 6, 1966  20 Sheets-Sheet 7

INVENTORS
Roger BRABON
Andre BEAUMARIAGE
Roland DE BROYER
Willy DE BOECK
Firmin DELPLANCKE
Marcel VAN INNIS

ATTORNEY

INVENTORS
Roger BRABON
Andre BEAUMARIAGE
Roland DE BROYER
Willy DE BOECK
Firmin DELPLANCKE
Marcel VAN INNIS Sept. 2, 1969 R. BRABON ET AL 3,465,097
SUBTITLING SYSTEM FOR TELEVISION PROGRAMS
Filed Sept. 6, 1966 20 Sheets-Sheet 9

INVENTORS
Roger BRABON
Andre BEAUMARIAGE
Roland DE BROYER
Willy DE BOECK
Firmin DELPLANCKE
Marcel VAN INNIS

ATTORNEY

*INVENTORS*
Roger BRABON
Andre BEAUMARIAGE
Roland DE BROYER
Willy DE BOECK
Firmin DELPLANCKE
Marcel VAN INNIS

*ATTORNEY*

INVENTORS
Roger BRABON
Andre BEAUMARIAGE
Roland DE BROYER
Willy DE BOECK
Firmin DELPLANCKE
Marcel VAN INNIS

ATTORNEY

Sept. 2, 1969                    R. BRABON ET AL                    3,465,097
SUBTITLING SYSTEM FOR TELEVISION PROGRAMS
Filed Sept. 6, 1966                                        20 Sheets-Sheet 13
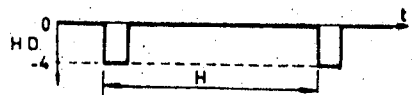
FIG.33
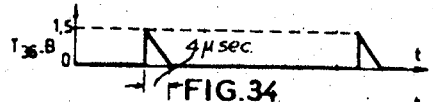
FIG.34
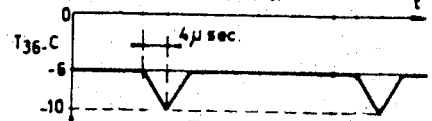
FIG.35
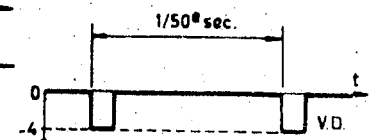
FIG.36
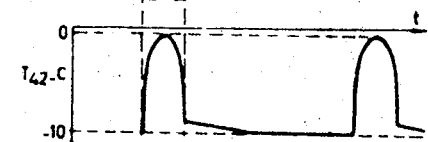
FIG.39
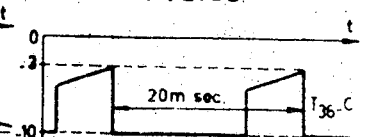
FIG.37
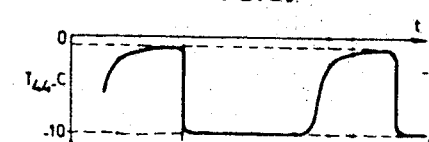
FIG.40
FIG.38
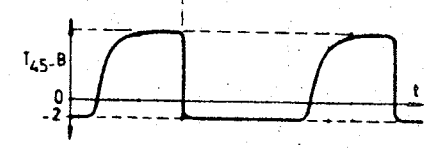
FIG.41
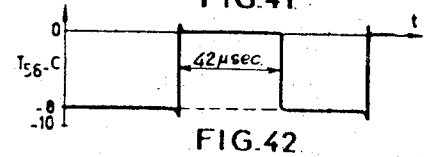
FIG.42
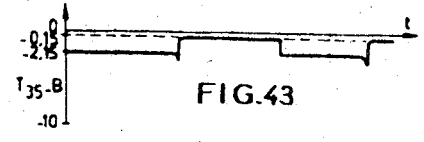
FIG.43
*INVENTORS*
Roger BRABON
Andre BEAUMARIAGE
Roland DE BROYER
Willy DE BOECK
Firmin DELPLANCKE
Marcel VAN INNIS
*ATTORNEY*

Sept. 2, 1969  R. BRABON ET AL  3,465,097

SUBTITLING SYSTEM FOR TELEVISION PROGRAMS

Filed Sept. 6, 1966  20 Sheets-Sheet 14

*INVENTORS*
Roger BRABON
Andre BEAUMARIAGE
Roland DE BROYER
Willy DE BOECK
Firmin DELPLANCKE
Marcel VAN INNIS

*ATTORNEY*

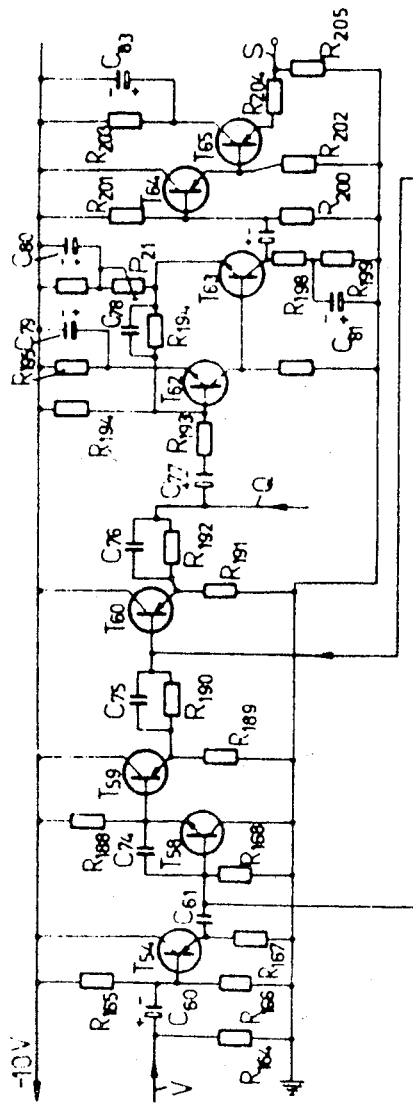
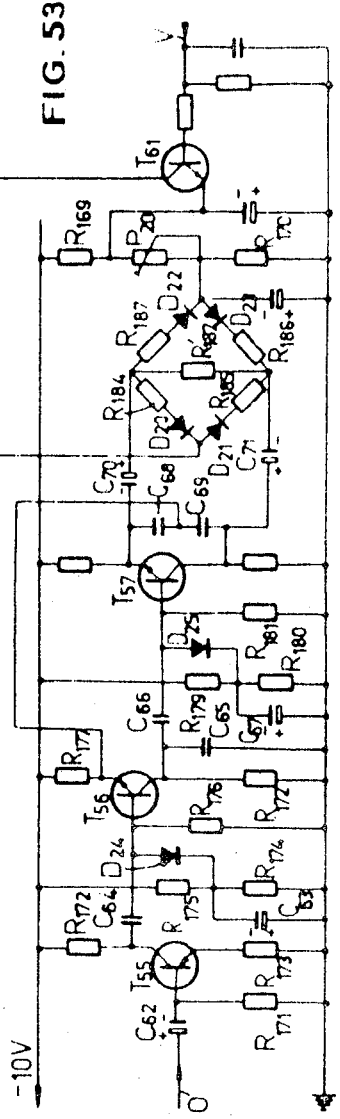
FIG. 53
INVENTORS
Roger BRABON
Andre BEAUMARIAGE
Roland DE BROYER
Willy DE BOECK
Firmin DELPLANCKE
Marcel VAN INNIS
*ATTORNEY*

*INVENTORS*
Roger BRABON
Andre BEAUMARIAGE
Roland DE BROYER
Willy DE BOECK
Firmin DELPLANCKE
Marcel VAN INNIS

*ATTORNEY*

INVENTORS
Roger BRABON
Andre BEAUMARIAGE
Roland DE BROYER
Willy DE BOECK
Firmin DELPLANCKE
Marcel VAN INNIS

ATTORNEY

# United States Patent Office 3,465,097
Patented Sept. 2, 1969

3,465,097
SUBTITLING SYSTEM FOR TELEVISION PROGRAMS
Roger Brabon, Auderghem, Andre Beaumariage, Brussels, Willy De Boeck, St.-Gilles-Brussels, Roland De Broeyer, Leeuw-St.-Pierre, Firmin Delplancke, Brussels, and Marcel Van Innis, Meise, Belgium, assignors to Ateliers de Constructions Electriques de Charleroi (ACEC) Societe Anonyme, Brussels, Belgium
Filed Sept. 6, 1966, Ser. No. 577,513
Claims priority, application Belgium, Sept. 9, 1965, 669,390
Int. Cl. H04n 7/00, 3/02
U.S. Cl. 178—6                           22 Claims

ABSTRACT OF THE DISCLOSURE

The disclosure relates to an installation for producing subtitles on television programs. Such installation includes a paper strip on which the subtitle is printed, a motor for moving the strip in front of a camera, an emitter of control signals controlling the motor, and a camera control unit transmitting to the camera composite synchronization and horizontal and vertical scanning signals. In addition, a first amplifier is connected to the camera control unit for the transmission of the signals produced by the camera and a gating assembly is connected to the first amplifier and has inputs for the composite synchronization signals, for the vertical scanning signal and for an unblocking signal transmitted by the emitter of control signals, the unblocking signal determining the reading time of the subtitle. Furthermore, a second amplifier is connected to the gating circuit assembly and a program-subtitle mixing assembly is connected to the second amplifier and has a further input for the video signal of the program, the output of the program-subtitle mixing assembly being transmitted to a final communication center.

---

The present invention relates to a subtitling installation for television programs, comprising a subtitle support adapted to slide in front of a camera.

The superposition of a viewing signal for subtitles onto a viewing signal of a program presents numerous advantages, particularly in view of the time saving factor in the preparation of a program, in view of the absence of modifications of the document carrying the program, for example the film, and in view of the possibility of directly subtitling programs, etc.

A first object of the present invention consists of a subtitling installation in which the supporting means for the subtitles and the presentation of the subtitles to a camera are easily manipulatable and little cumbersome. According to the invention, the subtitle support is constituted by a strip folded in zigzag; in a particular embodiment of the invention, the supporting strip for the subtitles rotates on a driving drum actuated by an intermittent motor.

Another object of the invention consists of means enabling to transmit to the antenna, the signal of the subtitle at a desired moment and during a desired period of time. To this effect, the installation according to the invention comprises means for moving the viewing signal of the subtitle comprising, on one hand, a communication coming from the camera and, on the other hand, a communication with a device to determine the opening periods of the means for moving the viewing signal. Preferably, the device to determine the opening periods of the moving means comprises an unblocking pulse generator actuated by a contactor. In a preferred embodiment of the invention, the device to determine the opening periods of the moving means comprises an analysis assembly for the length of the subtitle which generates repetition pulses having variable lengths in function of the length of the subtitle, these pulses determinating the length of the unblocking pulses, preferably in synchronization with the vertical synchronization pluses.

Another object of the invention consists in placing the subtitle in chosen zones of the image of the program, that is, to frame the subtitle. According to the invention, the means for moving the viewing signal comprises two electronic gates arranged in series at the input of the first of which is applied the viewing signal coming from the camera, the first gate being opened during the unblocking pulses, while the second gate is opened during the simultaneous presence of the two opening pulses respectively generated at the rate of one pulse per raster and of one pulse per line.

A further object of the invention enables the installation to mix the viewing signal of the subtitle to the viewing signal of the program, in such conditions that the letters of the subtitles seen on a monitor be either black or white, which is preferable for an easy reading of the subtitles independently of the local luminosity of the image of the program, white surrounded by black edges or vice versa. According to the invention, the installation comprises a mixing device for the program viewing signal and the subtitles viewing signal, comprising a mixing stage on which is applied, on one hand, the program viewing signal and, on the other hand, pulses having opposite sign to the sign of the modulation of the installation, in synchronism with the viewing signal pulses of the subtitle, in such a way that on the grid of a monitor the letters of the subtitle are black. Preferably, the mixing device comprises in front of the mixing stage, a viewing signal pulses delay line superposed to the mixing stage with a corresponding sign with the modulation of the installation, as well as a delay assembly for the rear side of the viewing signal pulses superposed with a sign opposed to the one of the installation modulation, in such a way that on the grid of a monitor the letters of the subtitle are white surrounded by a black edge on the left.

Other details and particularities of the invention will appear from the following nonlimitative description with references to the drawings.

Figure 5:
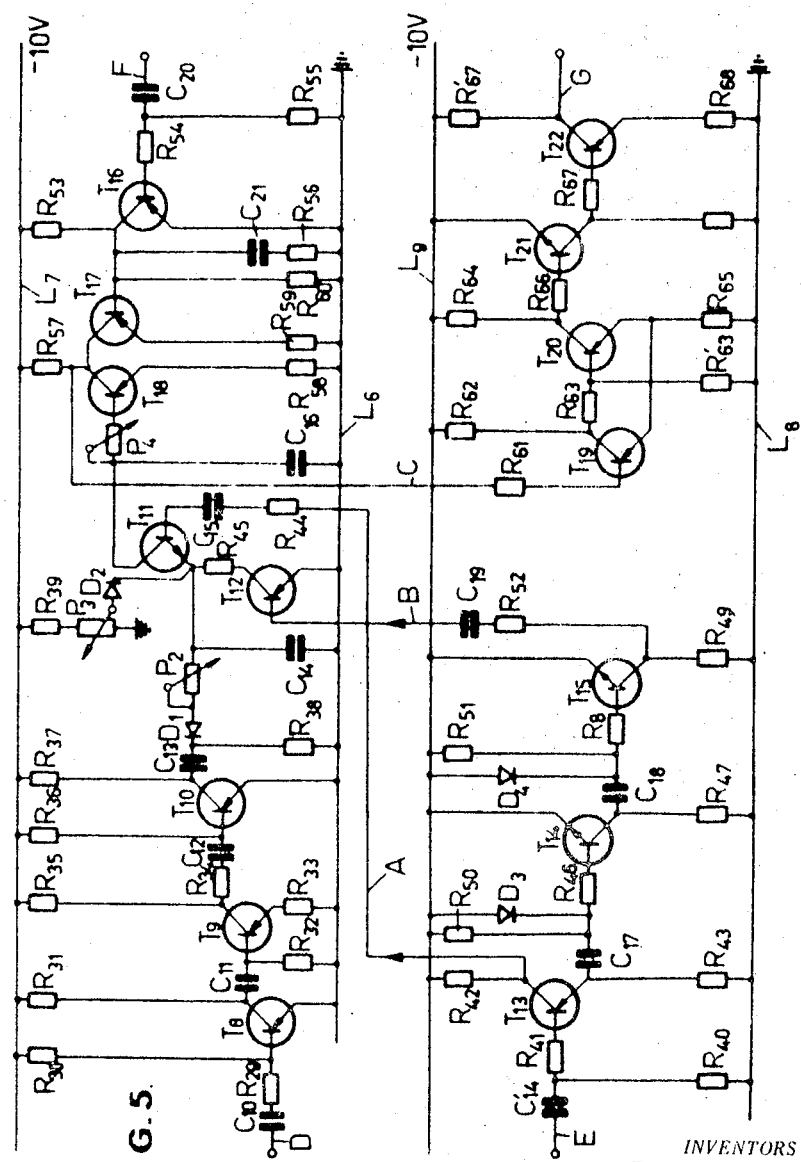
FIG. 5 represents an electric diagram of the related device to the one shown in FIG. 4 for the automatic determination of the time of reading.

FIGS. 6 to 14 and 6' to 14' represent the shape of the signals passing through various elements of the diagram according to FIG. 5, respectively for short and long subtitles.

FIGS. 15 to 21 represent the shape of the signals in other elements of the diagram shown in FIG. 5.

Figure 3:
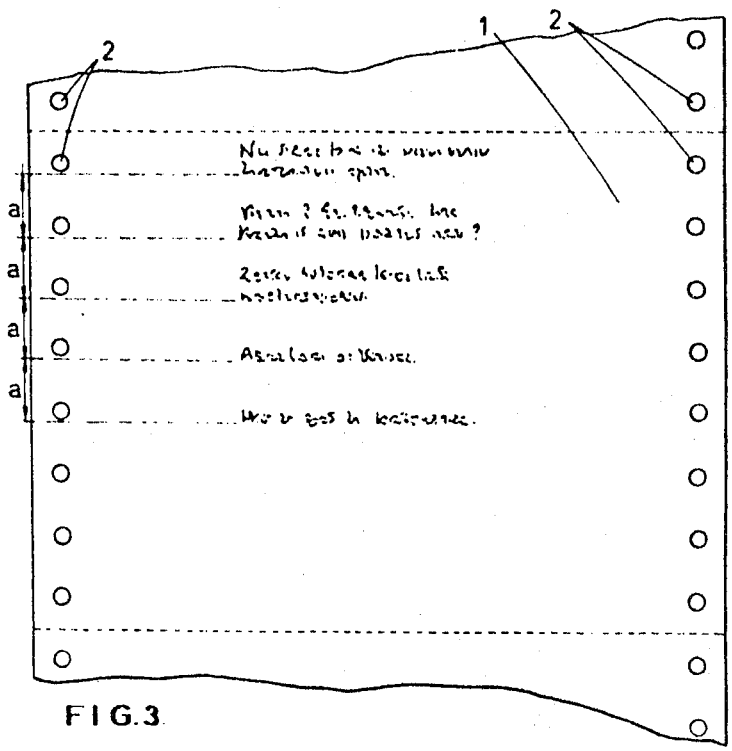
FIG. 3 is a plan view of a portion of a strip carrying the subtitles as seen in the installation shown in FIG. 1.
Figure 22:
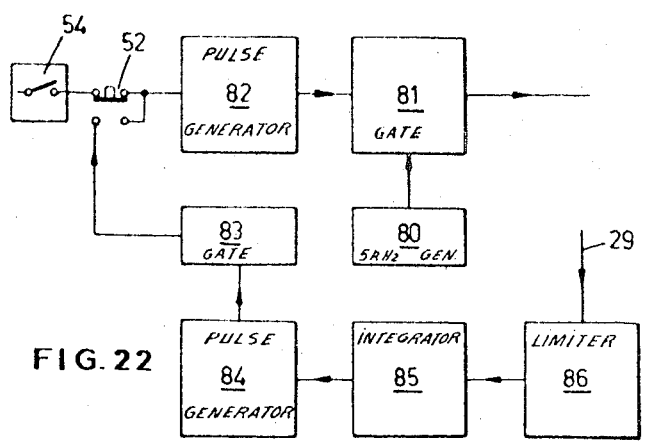

FIG. 22 is shown on the same sheet of drawing as FIG. 3 and represents a block diagram of the device for determining the reading time.

Figure 23:
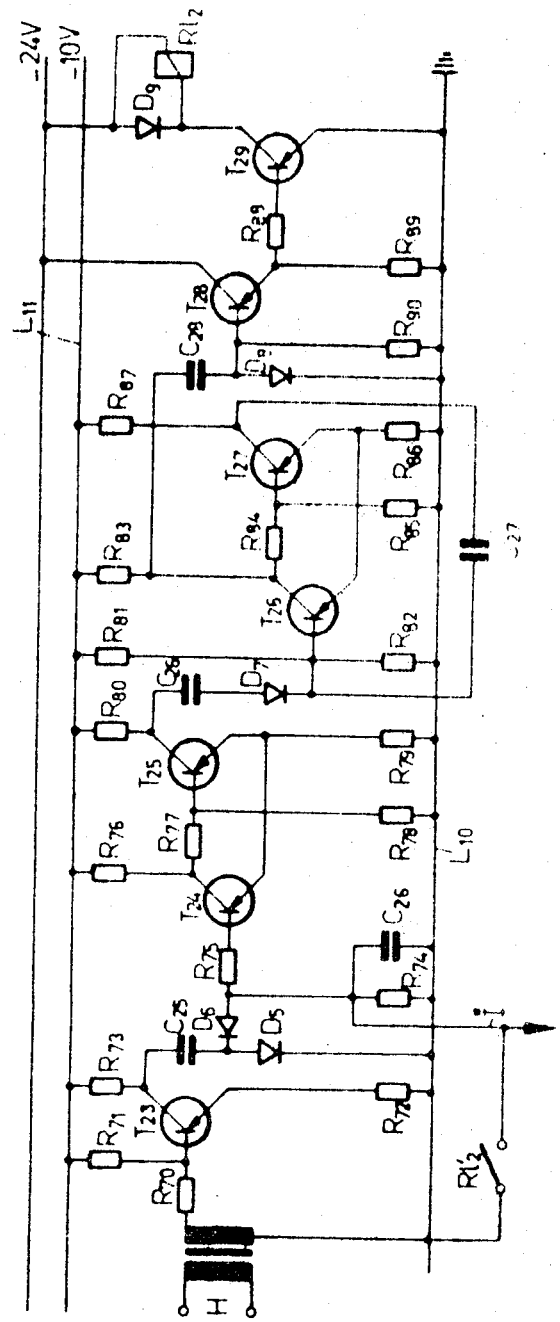
Figure 24:

FIG. 23 is an electric diagram of the control device for the feeding of the subtitles.

FIGS. 24 to 31 represent the shape of the signals in the various elements of the diagram shown in FIG. 22.

Figure 32A:
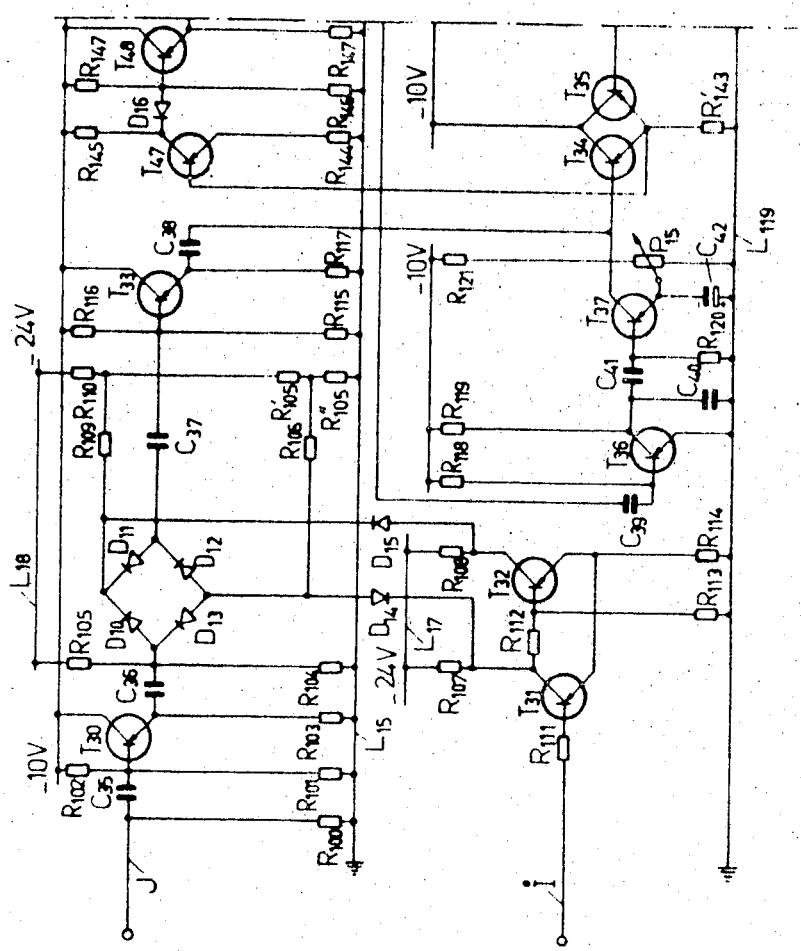
Figure 32B:
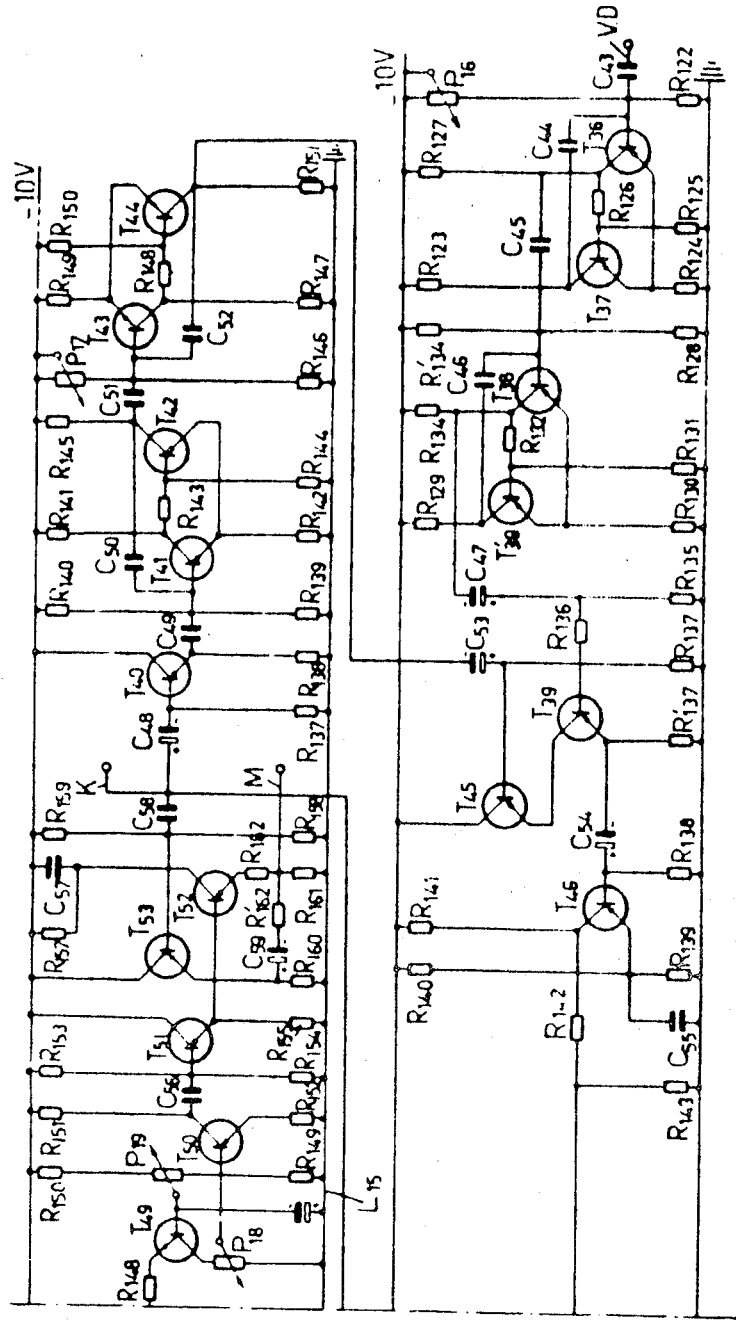
Figure 44:
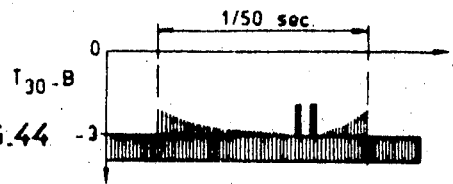
Figure 45:
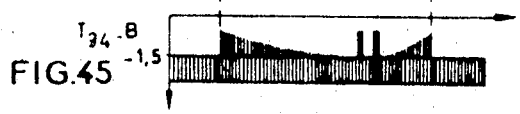
Figure 46:
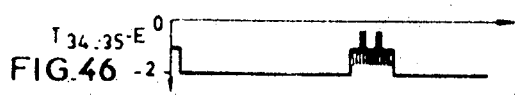

FIGS. 32a and 32b represent an electric diagram of the video frequency amplifier.

FIGS. 33 to 51 represent the shape of the signals passing through various elements in the diagram shown in FIG. 32.

Figure 52:
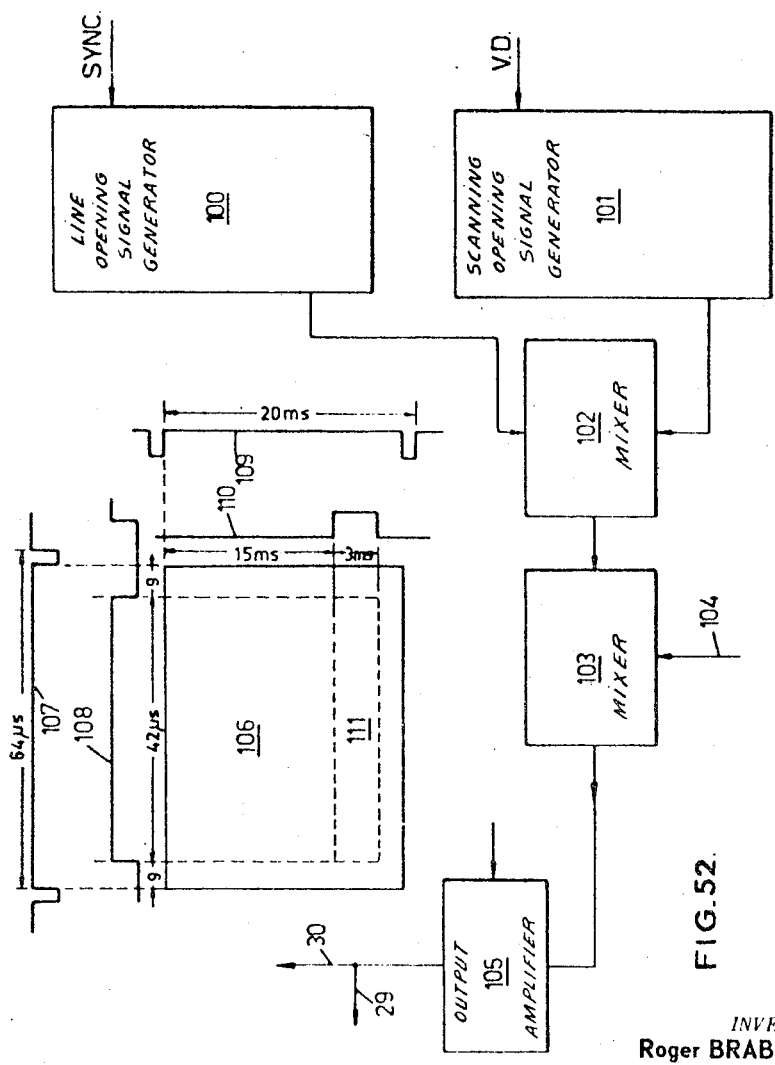

FIG. 52 represents a block diagram of the video frequency amplifier, with a drawing of the electronic framing.

Figure 55:
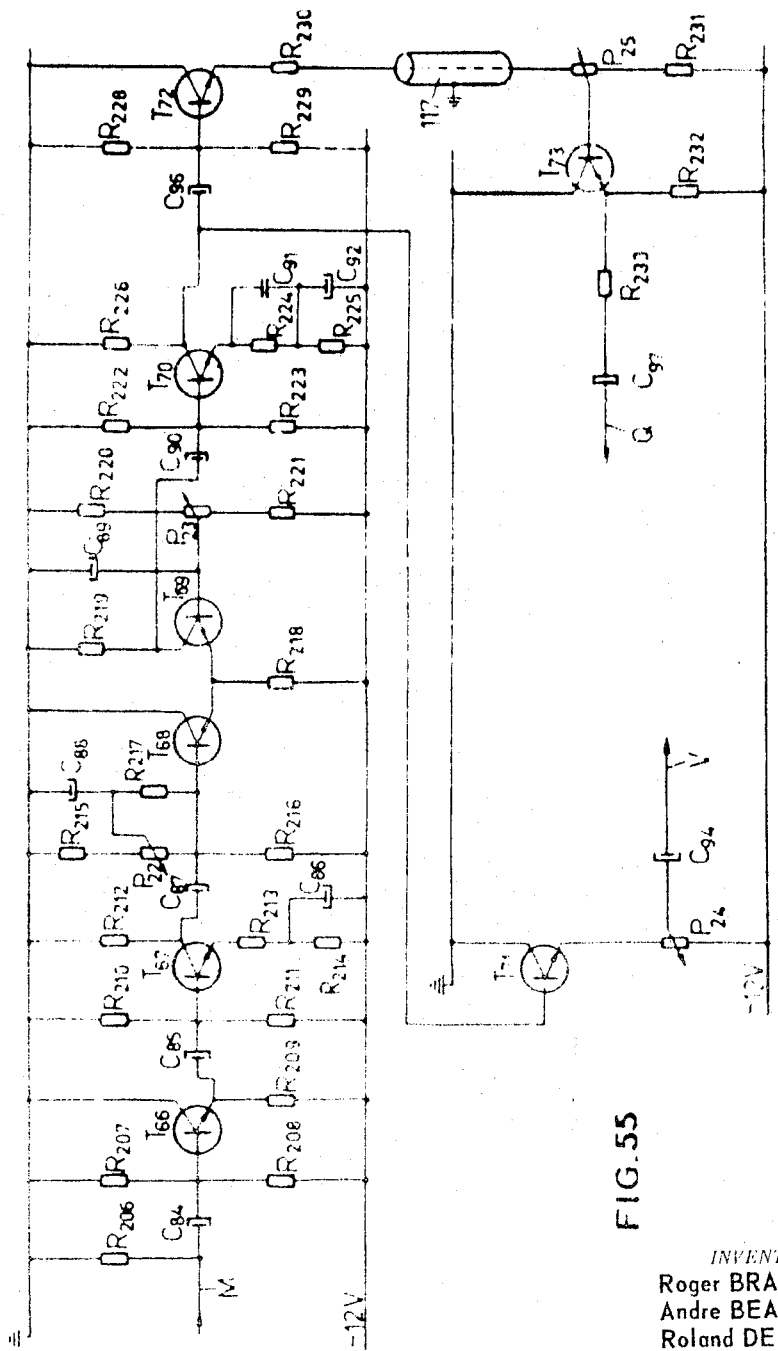

FIGS. 53 and 55 represent an electronic diagram of the "subtitle-program" mixing device.

Figure 54:
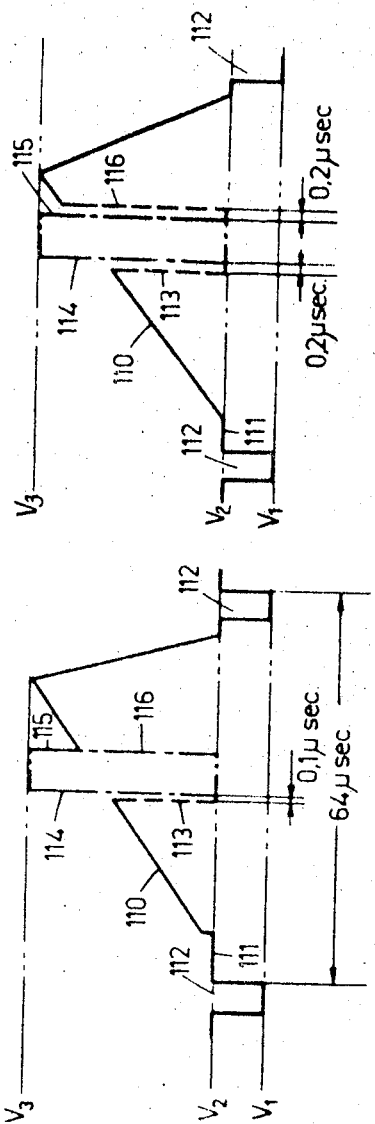

FIG. 54 represents the shape of the mixed signal.

Figure 56:
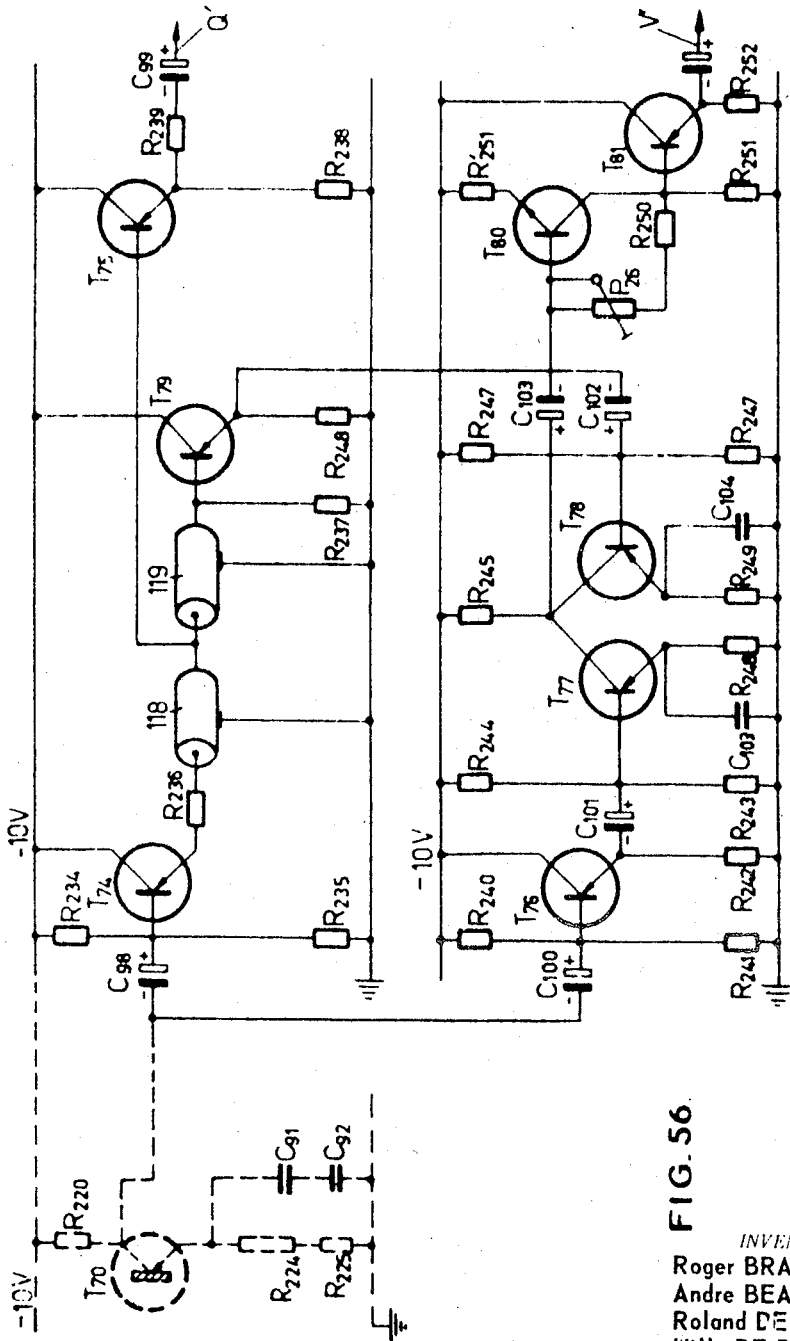

FIG. 54' represents the shape of the mixed signal, when the diagram of FIG. 56 is used.

FIG. 56 represents the electronic diagram of a different embodiment of the "subtitle-program" of the mixing device.

Figure 57:
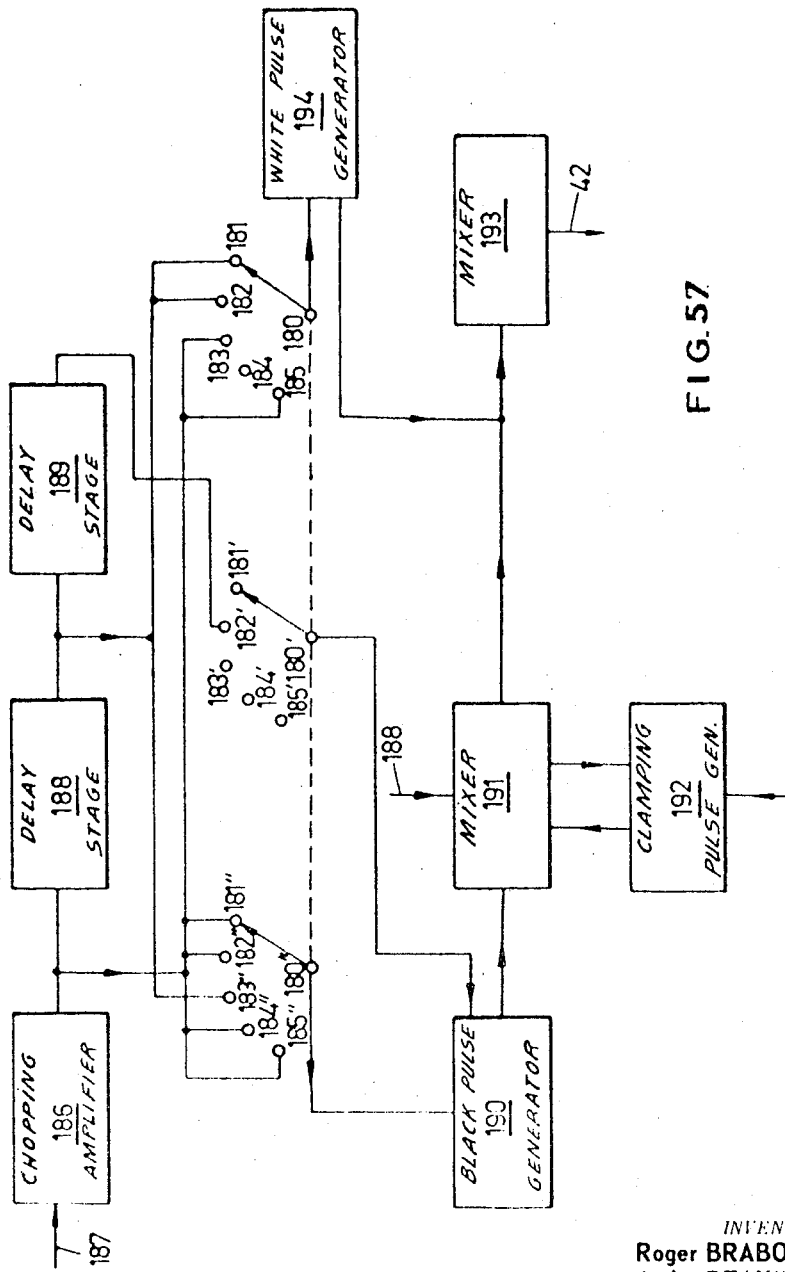

FIG. 57 is a block diagram illustrating the principle of the "subtitle-program" mixing device.

In the different figures, the same reference numbers represent analogous elements.

1. GENERAL DESCRIPTION OF THE INSTALLATION

First, the principle constituting part of the installation for subtitling and its operation will be described by making references to FIGS. 1 to 3. Then, more details will be given of each of the different parts.

The substitltes are typewritten with black types on a mat white paper strip 1 which is perforated as indicated by the reference number 2 along each of the longitudinal sides, and folded in zigzag. Each subtitle comprises at the maximum two lines of a type having equal thickness. The distance *a* between the last lines of the successive subtitles (single lines in the case of the subtitles having only one line) is constant.

The installation usually consists of a casnig 3 in which are located the apparatuses and circuits. In the middle part of the casing, is mounted on a sliding bracket 4, a machine 5 similar to a typewriter type but without a keyboard, the drum 6 of which drives the strip 1 carrying the subtitles before a television camera 7, which may be of the vidicon type. The drum 6 of the machine 5 has two peripheral rows of teeth 8, which penetrate into the perforations 2 of the strip 1 so as to drive it without any sliding effect. The machine 5 comprises a drum 6 which is driven by an electric motor energized through a switch 60, the motor acting on the drum through a ratchet 9 controlled by an electro-magnet 10, so as to move the drum step-by-step. A knob 11 for the rotation of the drum is located at one end of the drum 6. A drawer 12 having two pans 13 and 14 is located in the casing 1 under the machine 5. The strip 1 whose subtitles must be analyzed by the camera 7 is placed under the pan 13. The strip is brought on the drum by a first guiding rod 15 and a second guiding rod 16 and is then stored in the front pan 14. On the machine is fixed, on the side facing the camera 7, a white mask 17 having a slit 18, the strip 1 passing between the drum 6 and the mask 17.

Figure 1:
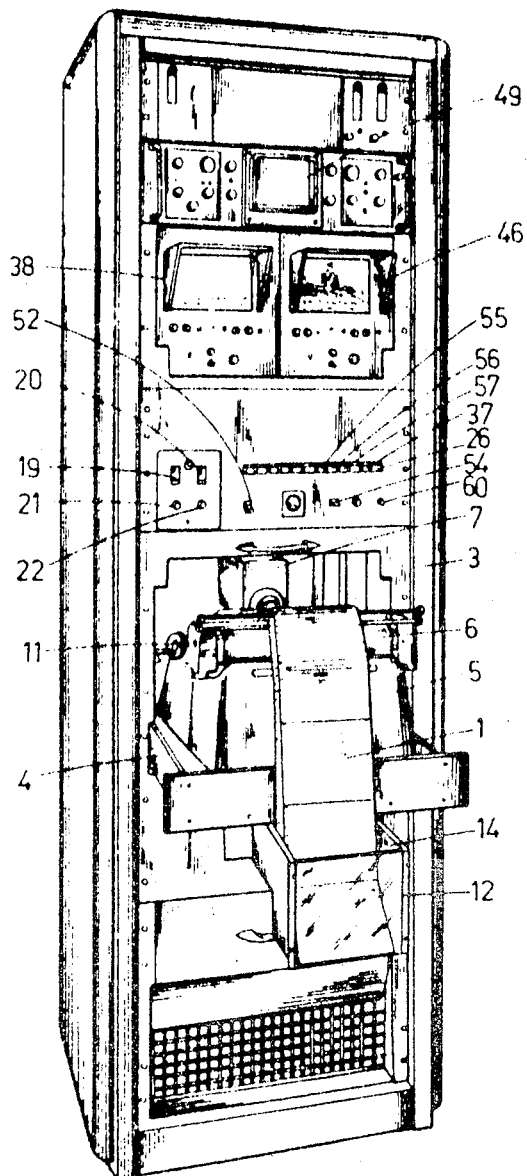
FIG. 1 is a perspective view of the installation to provide subtitles in television programs according to the invention.
Figure 2:
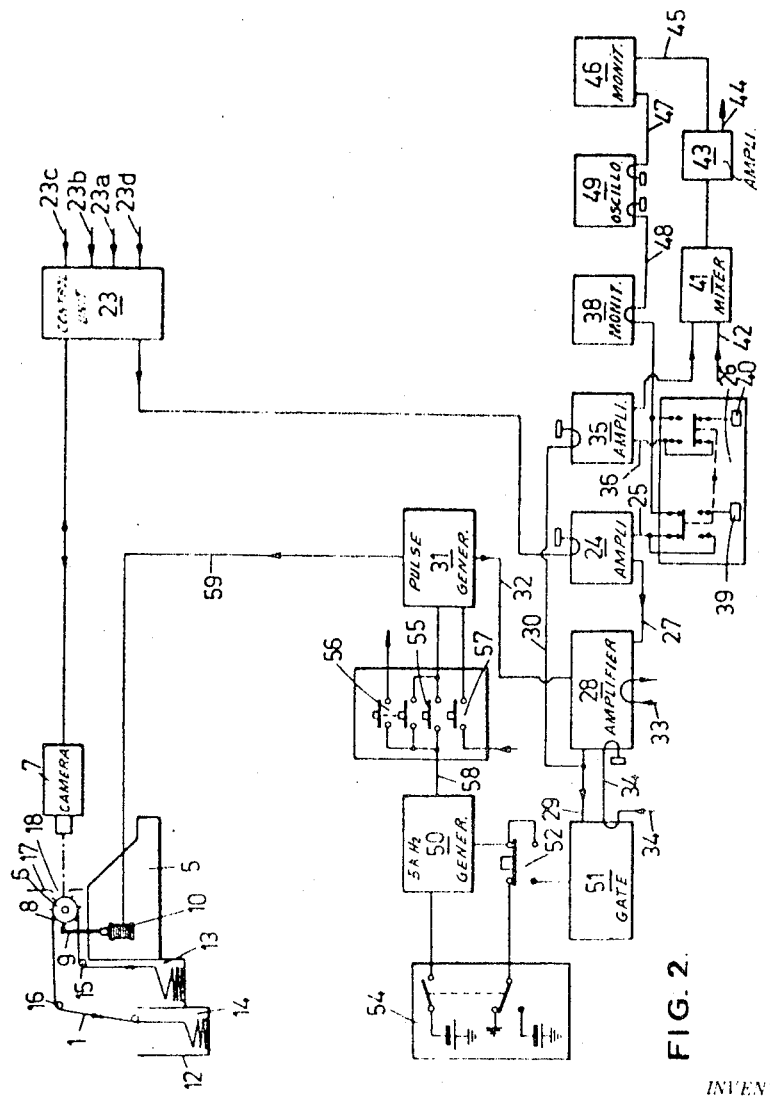
FIG. 2 is a block diagram of the installation according to FIG. 1.

The switches and knobs respectively represented by 19 to 22 in FIG. 1 are used to energize the chain of the camera of the vidicon, to control the current of the beam of the vidicon and to control the voltage of the target of the vidicon.

The installation also comprises a camera control unit 23 which transmits to the camera composite synchronization and gating horizontal and vertical scanning signals, which it receives through the lines 23*a*, 23*b*, 23*c* and 23*d*.

On the other hand, the unit 23 transmits the signals produced by the camera towards a first distribution amplifier assembly of the previewing type 24.

The signals coming out of the distribution amplifier 24 are transmitted, on one hand, by a line 25 and a double pull double throw switch 26, towards a viewing monitor 38 or towards an end resistor 39 and, on the other hand, by a line 27, towards an assembly 28, called video frequency amplifier whose function is to let the subtitles pass through the lines 29 and 30 only during predetermined time periods, in function of the reading time for each subtitle, by a signal coming from an assembly 31 by a line 32, the subtitles going through the lines 29 and 30 being cleaned and framed electronically in function particularly of the composite synchronization signal 33 and of the vertical synchronization signal 34 so as to transmit the video signal to the camera 7 only during the periods of time predetermined in view of the synchronization signals.

The signal of the subtitle enters through the line 30 in the second distribution amplifier assembly referred to as "cleaned subtitle distribution," 35 wherein the signal is transmitted, on one hand, by a line 36 and a switch 26, towards the viewing monitor 38 or towards an end resistor 40 and, on the other hand, towards a "program-subtitle" mixing assembly 41, to which arrives the image signal of the program, by a line 42 and from which a "picture+subtitle" composite signal leaves towards a distribution amplifier assembly 43. From there, a first line 44 goes towards a final communication center of the transmission, and a second line 45 goes towards a viewing monitor of the program 46. Through lines 47 and 48, the monitors 38 and 46 are connected to an oscilloscope 49 which, according to the position of the switch 26, will represent either the signal passing through the monitor 38, either the one passing through the monitor 46. The mixing assembly 41 comprises electronic circuits providing black edges around white types of the subtitles in such a way that they become visible on a circuits providing black edges around white types of the right side, or on the left and on the right sides or for providing types which are totally black or totally white.

The installation comprises a generator 50 of sinusoidal signals of five 5 kHz., whose oscillation passage duration determines the duration of the subtitle passage on the antenna. The installation comprises on the other hand an assembly 51 for the automatic determination of the reading time, that is the automatic determination of the passage duration of the signal of 5 kHz. according to the length of the successive subtitles. This assembly 51 receives, on one hand, the vertical synchronization signal by the line 34 and, on the other hand, the video signal of the subtitle whose length must be analysed, by the line 29. A reversing switch 52 measures, in the position shown in FIG. 2, the switching off of the assembly 51 of the automatic determination of the reading time, while in the second position, it is switched on. A double-pole switch 54 located at the disposal of an operator, permits in closed position and through the assembly 50, the beginning of the period of passage of the 5 kHz. signal in a line 58. When the reversing switch 52 is in the position where the assembly 51 is switched off (manual operation), it is the operator who, while releasing the switch 54, controls the end of the passage of the 5 kHz. signal: therefore, the operator controls not only the beginning but the duration of the passage of each subtitle and also the feeding of the following subtitles at the end of the current reading period. When the reversing switch 52 is in the switching in position of the assembly 51 (automatic operation), the operator while briefly actuating the switch, controls the beginning of the passage of the 5 kHz. signal and the duration of the passage of the signal, in function of the length of each subtitle and at last the feeding of the next subtitle at the end of the current reading period.

These switches 55, 56, 57 enable to send the 5 kHz. signal from the line 58, either towards the assembly 39 which controls the feeding of the strip 1 carrying the subtitle, either simultaneously towards this assembly 31 and on a line going towards an assembly enabling the magnetic registration of the wave train for controlling the feeding. If at the time of the transmission, the equipment to register the feeding control signals is used, only the switch 57 must be closed so that the registered wave trains of 5 kHz. may be sent in the assembly 31, by elements 50, 51 and 54 may be placed out of operation. The magnetic registering of the feeding control signals may particularly be made on a magnetoscope registering strip (the reverse track is then used to register the wave trains of 5 kHz.), or a track of a magnetic strip to synchronously accompany the registering of a movie film. The circuits of the assembly 31 transform each group of sinusoidal signals in groups of pulses having steep sides whose duration is equal to the reading time of the subtitle. The rear side of each pulse actuates a relay whose contact causes on one hand and through the line 59 the actuation of the electro-magnet 10 causing the rotation of the drum 6 of the machine 5 by one step, that is the feeding of a subtitle, and on the other hand, the elimination of the detected voltage of the signal 5 kHz. in the assembly 31, which results in the blocking of the video frequency assembly 28.

The most important assemblies hereinabove mentioned will now be described in greater detail.

2. DEVICE FOR THE DETERMINATION OF THE READING TIME (FIGS. 4 to 22)

As explained in paragraph 1 of the description, the passage duration of a subtitle on the antenna is determined by the passage duration towards the video frequency amplifier 28 of a sinusoidal signal of 5 kHz.

The device under the present heading comprises a sinusoidal signal generator having frequencies of 5 kHz. The sinusoidal signal is permanently produced by a transistor $T_1$ of the n.p.n. connected in an oscillator RC, the resistors and capacitors being represented respectively by $R_1$ to $R_6$ and by $C_1$ to $C_4$, the whole being connected between a ground line $L_1$ and a line $L_2$ carrying a voltage of $-10$ v.

The sinusoidal signal is applied, through a potentiometer for adjusting the gain $P_1$, and a capacitor $C_5$ to the base of a transistor $T_2$ of the n.p.n. type. The base of the transistor $T_2$ is on the other hand connected, through a resistor $R_2$ to a line $L_3$ having a voltage of $-24$ v. and by a resistor $R_9$ between the emitter of a transistor $T_3$ and a resistor $R_{10}$ connected on the same line $L_3$. The emitter of the transistor $T_2$ is connected to the primary of an output transformer $Tr_1$ which is connected to a line $L_4$ having a voltage of $-10$ v. A collector of the transistor $T_2$ is connected to a ground line $L_5$ through an assembly $R_{11}C_6$.

The arrangement further comprises transistors $T_4$, $T_5$, $T_6$ and $T_7$, polarized by means of resistors $R_{11}$, $R_{25}$. The transistors $T_5$, $T_6$ constitute a flip-flop arrangement.

When the reversing switch 52 is in the manual operating position and that the double-pole contactor 54 is in an operative position, the base of the transistor $T_4$ is connected to the ground, through the resistance $R_{11}$ and the line $L_1$. This transistor is therefore blocked and the flip-flop arrangement $T_5$, $T_6$ is in an unoperative position ($T_5$ blocked, $T_6$ conducting). The voltage on the collector of the transistor $T_6$ is then such that the transistor $T_3$ is blocked. Accordingly, the base of the transistor $T_2$ is more negative than its emitter and this transistor $T_2$ is blocked.

When the operator closes the contactor 54, the resistor $R_{11}$ is connected, through the line $L_2$, to the $-10$ v. The transistor $T_4$ unblocks itself, the assembly $T_5$, $T_6$ reverses its operation, the transistors $T_3$ and $T_2$ unblock themselves and the sinusoidal signal of 5 kHz. becomes available at the terminals of the resistor $R_{26}$. When the operator releases the contactor 54, the device comes back to in starting position, the transistor $T_2$ being blocked.

When the inverter 52 is in the automatic operating position, and that the operator closes the contactor 54, a capacitor $C_7$, connected to a voltage of $-24$ v. through a resistor $R_{27}$, discharges itself in the coil of a relay $R1_1$.

The contact $R1'_1$ of this relay closes and establishes a contact between the capacitor $C_8$ having a voltage of $-10$ v. through a resistor $R_{28}$, on one hand, towards the resistor $R_{11}$ and, on the other hand, towards the capacitor $C_9$. This capacitor $C_9$ is charged to a voltage of $-10$ v. through the condenser $C_8$. The resistor $R_{11}$ is connected through the contact $R1'_1$ and the resistor $R_{28}$ to $-10$ v. The transistor $T_4$ unblocks itself and as above described, the sinusoidal signal of 5 kHz. passes through the transistor $T_2$.

As soon as the capacitor $C_7$ is discharged, the relay $R1_1$ is deenergized and the connection between the capacitors $C_8$ and $C_9$ is broken. The transistor $T_4$ remains unblocked during a certain time due to the difference of potential across the terminals of the capacitor $C_9$; the latter discharges itself through the transistor $T_7$ which is normally blocked, but on the base of which are applied repetition frequency pulses equal to 50 Hz. (frequency of the raster scanning) and of variable width, which unblocks the transistor. The production of these variable width pulses will be hereinafter described; it would be sufficient for the time being to know that the width of the said pulses is inversely proportional to the length of the subtitle; therefore, for a short subtitle, the pulses will have a greater width comparatively to the width of the pulses for a long subitle and consequently for a short subtitle the discharge time of the capacitor $C_9$ will be faster than for a long subtitle. When the difference of potential at the terminals of the capacitor $C_9$ is lower to a certain value, the transistor $T_4$ blocks itself, the flip-flop arrangement $T_5$, $T_6$ comes back in a position of rest and the transistor $T_2$ blocks itself.

The way the variable width pulses are obtained in function of the length of the subtitle will now be described, with reference to FIG. 5, the said pulses controlling the transistor $T_7$.

The viewing and synchronization composite signal which comes out of the video frequency amplifier through the line M is brought, to the line D and through a capacitor $C_{10}$ and a resistance $R_{29}$, to the base of the first of the three resistors $T_8$, $T_9$, $T_{10}$ whose resistors and polarized capacitors are represented by $R_{30}$ to $R_{37}$ and $C_{11}$ to $C_{12}$ between a line $L_6$ connected to the ground and a line $L_7$ having a voltage of $-10$ v.

The transistor $T_8$ leads, independently of the presence of a signal in the line D, and it is saturated in such a way that the synchronization signals, which makes the base of the transistor still more negative, are chopped, and in such a way that only the viewing signals, having an opposed sign, producing a variation in the current of the collector and being transmitted as negative pulses, pass through the capacitor $C_{11}$ to the base of the transistor $T_9$. This transistor is normally blocked, the aforementioned pulses unblocking it and maintaining the passage of a collector current going positively from approximately $-10$ v. to a value such as ($-3$ v. for example) that these pulses block the transistor $T_{10}$ which normally are sufficient for its operation. Consequently, during the duration of each pulse of the viewing signal, a signal having a constant amplitude of approximately $-10$ v. is available at the collector of the transistor $T_{10}$.

FIGS. 6 to 9 illustrate the shape of the signals for each of the transistors $T_8$ to $T_{10}$, which is present in the time interval between two consecutive vertical synchronization signals, the said FIGURES 6 to 9 representing a subtitle having only one line while FIGS. 6' to 9' represent a subtitle having two lines.

Each constant amplitude pulse having a negative signal is transmitted by a capacitor $C_{13}$ to a detection stage comprising a capacitor $C_{14}$, a resistor $R_{38}$, a potentiometer $P_2$ and a diode $D_1$, in such a way that on the capacitor $C_{14}$ a charge is accumulated, the said charge being all the more important as the number of pulses is great and consequently as is great the number of types of the subtitles. The constant of time of the detection stage is chosen as lower to the duration of all the pulses of a long subtitle. Between the successive pulses which charge it, the capacitor $C_{14}$ cannot be discharged on account of the blocking state during the integration periods of the two transistors $T_{11}$ and $T_{12}$ to which the capacitor $C_{14}$ is connected.

Considering that it has been established that the required time for reading a subtitle comprising two full lines is smaller than the double of the time required for the reading of one line, it is possible to foresee an assembly comprising a resistor $R_{39}$, a potentiometer $P_3$ and a diode $D_2$, connected between the line $L_7$ and the connection between the potentiometer $P_2$ and the capacitor $C_{14}$, the function of the said assembly being to direct towards the line $L_7$, the pulses over the required number to bring the charge of the capacitor $C_{14}$ to a predetermined value negatively exceeding the one at the output of the potentiometer $P_3$; in fact, at this moment, the diode $D_2$ is conducting.

To transmit the charge of the capacitor $C_{14}$, it is required to periodically unblock the transistor $T_{11}$. To this effect, the vertical synchronization signals present in the line E are transmitted to the capacitor $C'_{14}$ to the base of a transistor $T_{13}$ polarized by the resistors $R_{40}$, $R_{41}$, $R_{42}$, $R_{43}$ between a grounded line $L_8$ and a line $L_9$ having a voltage of $-10$ v. The transistor is unblocked during the duration of the vertical synchronization pulses and transmits these pulses after amplification and reversal of their sign to the base of the transistor $T_{11}$, by the line A, through a resistance $R_{44}$ and a capacitor $C_{15}$.

During each pulse transmitted through the line A, the transistor $T_{11}$ unblocks itself and the capacitor $C_{14}$ discharges itself on a capacitor $C_{16}$, the transistor $T_{12}$ being still blocked between this period as it will be explained hereinbelow. The capacitance of the capacitor $C_{14}$ exceeds considerably the capacitance of the capacitor $C_{16}$ in such a way that the unblocking duration of the transistor $T_{11}$ is lower than the time required for the capacitor $C_{16}$ to be completely discharged. To eliminate the remaining charge of the capacitor $C_{14}$, before the beginning of the arrival on this capacitor of charges due to the viewing signals of the following raster, a retarding assembly of 0.3 ms. (millisecond) of the vertical synchronziation signal is used which unblocks during one millisecond, the transistor $T_{12}$ through which and by means of a resistor $R_{45}$ operates the flow of the remaining charge of the condenser $C_{14}$.

Figure 10:
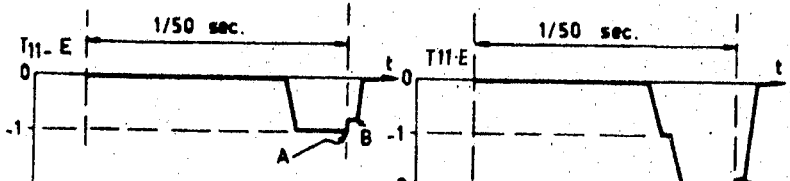
Figure 11:
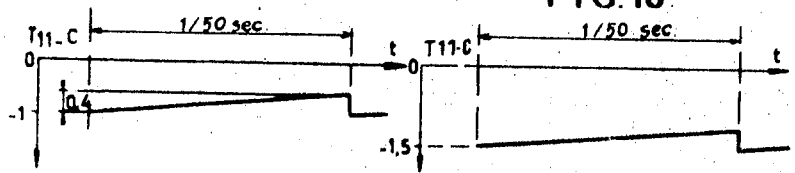
Figure 12:
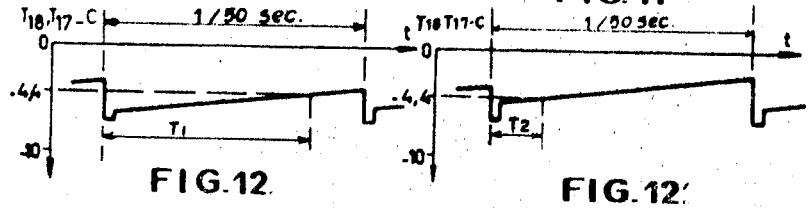
Figure 15:
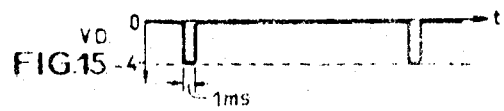
Figure 16:
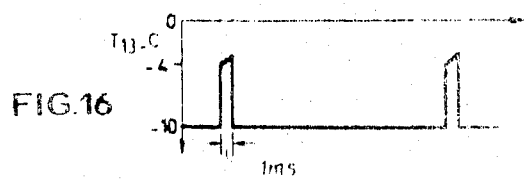
Figure 17:
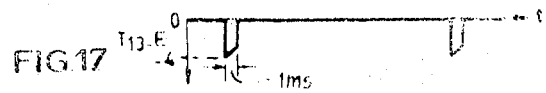
Figure 18:
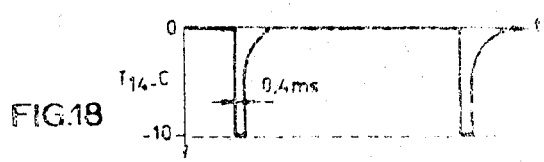
Figure 19:
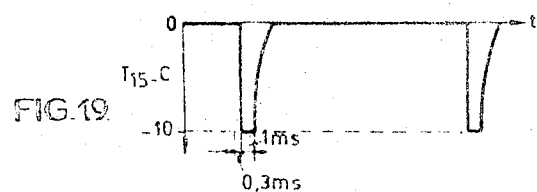
Figure 20:
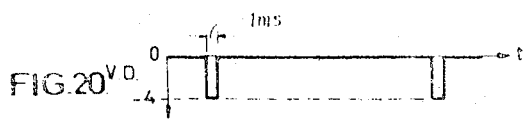

This retardation assembly comprises two transistors $T_{14}$, $T_{15}$ polarized by the resistors $R_{46}$ to $R_{49}$. The signal present at the emitter of the transistor $T_{13}$, FIG. 16 having a negative sign, is differentiated by a capacitor $C_{17}$ and a resistor $R_{50}$, but due to the polarization of the transistor $T_{14}$ only the pulse differentiated on the rear side which has a positive appearance, unblocks the n.p.n. transistor $T_{14}$ during 0.4 ms., the differentiated pulse on the front side being evacuated in the line $L_9$ through the diode $D_3$. The pulse present at the collector of the transistor $T_{14}$ is once more differentiated by a capacitor $C_{18}$ and a resistor $R_{51}$, and due to the polarization of the transistor $T_{15}$, only the differentiated pulse on the rear side unblocks the transistor $T_{15}$, the differentiated pulse on the front side being evacuated in the line $L_9$ by the diode $D_4$. At the collector of the transistor $T_{15}$, there is a negative sign pulse which starts 0.3 ms. after the end of each vertical synchronization pulse and which lasts 1 ms. (FIG. 15). It is this pulse which is transmitted by the line B, to the base of the transistor $T_{12}$, by means of a resistor $R_{52}$ and a capacitor $C_{19}$. The shape of the signal at the emitter of the transistor $T_{11}$ is illustrated in FIGS. 10 and 10'. From 0, the voltage at the emitter increases during and in function of the increase of the voltage of the capacitor $C_{14}$, with a level portion for the corresponding signal to a subtitle having two lines (FIG. 10') due to the scanning period of the subtitle space located between two lines and during which the charge of the capacitor $C_{14}$ cannot vary. At the time of the impulsion of the vertical synchronization signal, the voltage at the emitter of the transistor $T_{11}$ decreases with the flowing of a part of the charge of the capacitor $C_{14}$ towards the capacitor $C_{16}$. At the end of the vertical synchronization pulse and during 0.3 ms. the discharge of the capacitor $C_{16}$ is stopped until the arrival of the pulse coming through the line D which unblocks the transistor $T_{12}$ and permits in 1 ms. the complete flow of the charge of the capacitor $C_{16}$ and consequently the return to the 0 voltage of the emitter of the transistor $T_{11}$. To the collector of the transistor $T_{11}$, the signal has the shape represented in FIGS. 11 and 11'; the level portion of this signal is determined by the voltage of the capacitor $C_{16}$ and is more negative in the case of a long subtitle than in the case of a short subtitle.

Figure 21:
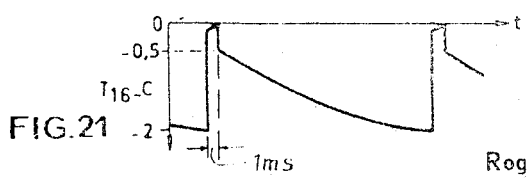

The vertical synchronization signals are equally utilized to obtain a sawtooth signal. To this effect, the vertical synchronization signals are brought by a line F and an assembly $C_{20}$, $R_{55}$ to the base of a transistor $T_{16}$ polarized by the resistors $R_{53}$, $R_{60}$, $R_{54}$ and unblock the transistor. Between the collector $T_{16}$ and the grounded line $L_6$ are connected a capacitor $C_{21}$ and a resistor $R_{56}$. The resistor $R_{53}$ is considerably greater than the resistance $R_{56}$ in such a way that when the transistor $T_{16}$ does not operate, the voltage of the capacitor $C_{21}$ and of the collector of the transistor $T_{16}$ is much greater than $-10$ v. and approximately $-2$ v. When the transistor $T_{16}$ operates, the voltage at the collector of the transistor $T_{16}$ sharply increases and the capacitor $C_{21}$ discharges itself through this transistor; at the end of the vertical synchronization pulse, this same capacitor $C_{21}$ recharges itself through the resistor $R_{53}$, $R_{56}$, bringing progressively and exponentially the voltage of the collector to approximately $-2$ v. A signal having the shape represented in FIG. 21 is therefore obtained at the collector of the transistor $T_{16}$. The signal is applied at the base of a transistor $T_{17}$ whose collector is polarized in common with the collector of a transistor $T_{18}$ through a resistor $R_{57}$, while the emitters of the two transistors are respectively polarized by resistors $R_{58}$ and $R_{59}$. At the base of the transistor $T_{18}$ is applied the signal of the collector of the transistor $T_{11}$, by means of a potentiometer $P_4$.

The transistor $T_{17}$ operates normally in such a way that a sawtooth signal is obtained at its collector whose continuous level portion is determined by the transistor $T_{18}$, normally blocked and conducting only when the capacitor $C_{16}$ receives a charge. The more this charge is negative and therefore the longer is the subtitle, the more the current emitter-collector of the transistor $T_{18}$ is great and less negative is the voltage of the collector of the transistor $T_{18}$ (see FIGS. 12 and 12').

Figure 13:
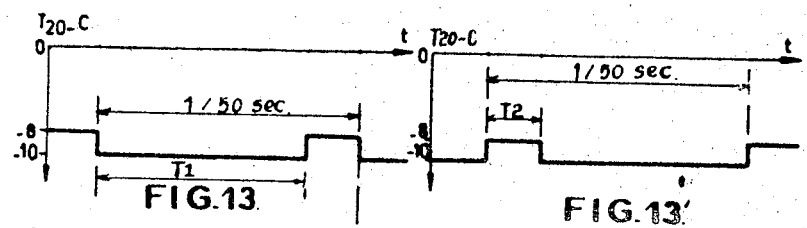
Figure 14:
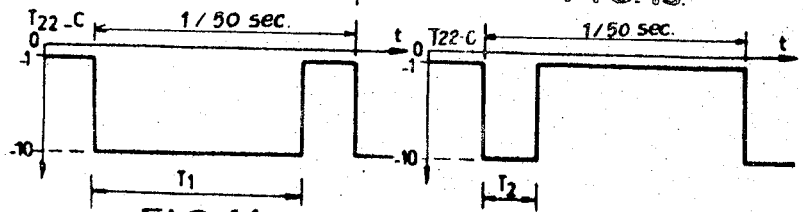

The signal of the collector of the transistor $T_{18}$ and $T_{17}$ is transmitted, by a line C and a resistor $R_{61}$, to a flip-flop arrangement having two transistors $T_{19}$, $T_{20}$, polarized by the resistors $R_{62}$ to $R_{65}$, whose transistor $T_{20}$ normally operates while the transistor $T_{19}$ unblocks only when the voltage at the base is more negative than $-4.4$ v. Owing to the fact that when the transistor $T_{15}$ operates, the transistor $T_{19}$ is blocked, a signal is obtained at the collector of the transistor $T_{20}$ whose shape is represented in FIGS. 13 and 13', having a repetition frequency of 50 kHz. (frequency of the vertical polarization signal) of rectangular pulse, negatively increasing, whose width $T_1$ or $T_2$ represents the unblocking time of the transistor $T_7$ and is that much greater than the subtitle is short. This signal is successively applied to two transistors $T_{21}$, $T_{22}$, polarized by resistors $R_{66}$ to $R_{68}$, which determine at a constant value the levels of the signal which is transmitted by a line G to the transistor $T_7$.

It is to be noticed that the potentiometers $P_2$, $P_4$ adjust the area of the reading time, the said time being chosen between 1 second for a very short title and an adjustable maximum by means of the potentiometer $P_3$, of five seconds in the case of a subtitle of maximum length.

FIG. 22 represents a block diagram of the device for the determination of the reading time. The reference character 80 designates the generator stage of the 5 kHz. signal, having a transistor $T_1$, whose output is applied to a gate 81 (transistor $T_2$) on which is on the other hand applied an unblocking signal coming from the video pulse generator 82 either during the closing duration of the contactor 54 when the reversing switch 52 is in the manual operating position, either during the unblocking of the assembly 83 comprising the transistor $T_7$ in function of the pulse generator 84 having a variable width according to the length of the subtitle, and which comprises the transistors $T_{16}$, $T_{17}$, $T_{19}$ to $T_{22}$. When the switch 52 is in the automatic operating position, a signal is applied to the generator 84, the said signal coming from the integration stage 85, comprising in particular the capacitors $C_{13}$, $C_{16}$ which generate a voltage in function of the length of the subtitle, the signal of the latter coming from the video frequency amplifier 26 being applied to a limiting stage 86 comprising the transistors $T_8$, $T_9$, $T_{10}$.

3. DEVICE TO CONTROL THE FEEDING OF THE SUBTITLES
(FIGS. 23 to 31)

The object of this device is on one hand to establish a control pulse for the opening of the video frequency amplifier 28 in the presence of the 5 kHz. signal at the output of the reading time determination device, and on the other hand to establish, for the elimination of the above-mentioned pulse, a signal producing the feeding of a determined length of the strip 1 carrying the subtitles.

Figure 4:
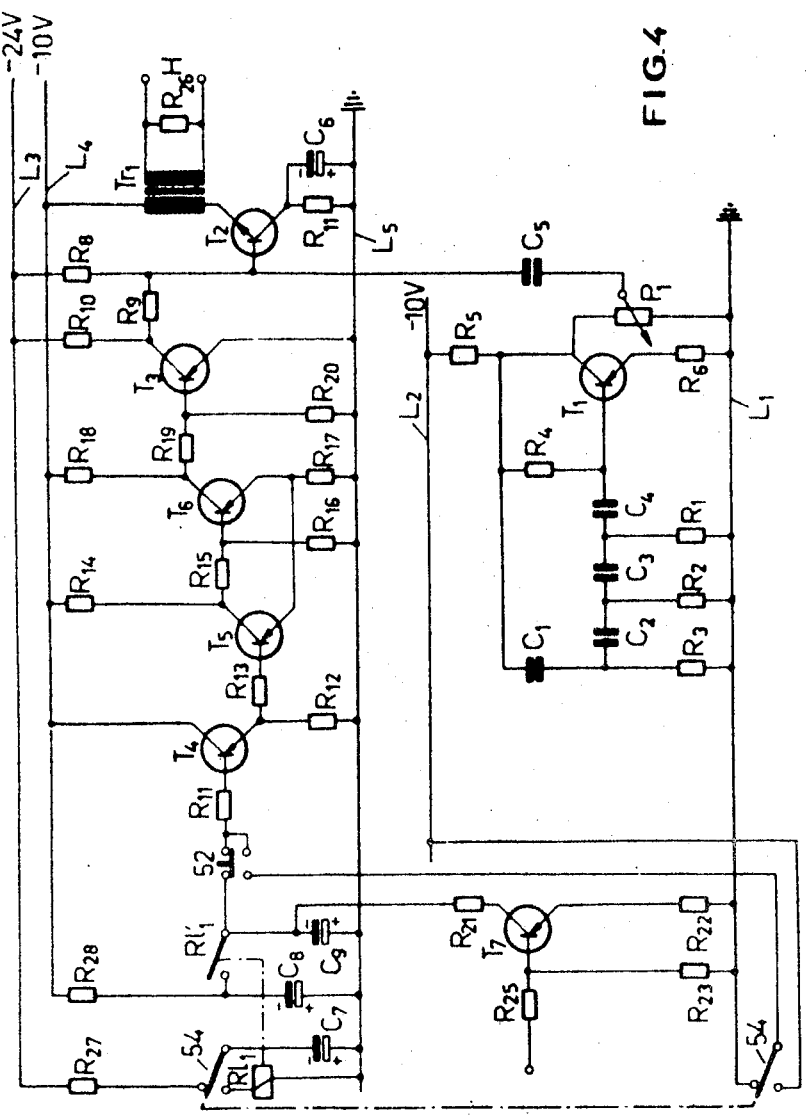
FIG. 4 is an electric diagram of the device to determine the time of reading.
Figure 25:
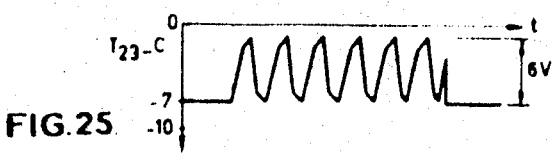
Figure 26:
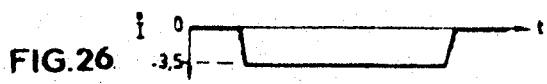
Figure 27:
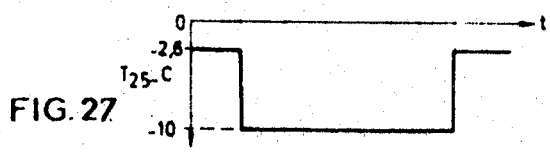
Figure 28:
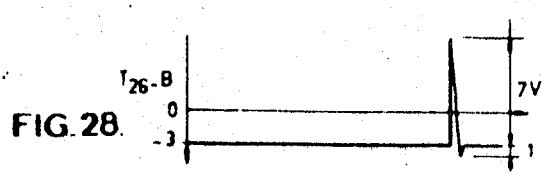
Figure 29:
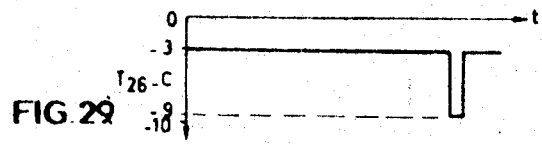
Figure 30:
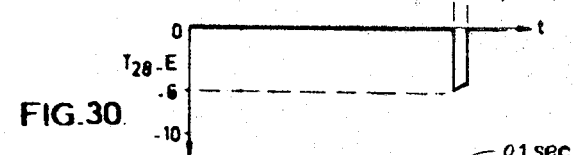
Figure 31:
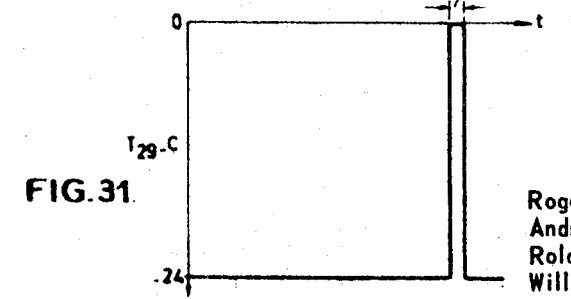

To this effect, the 5 kHz. signal coming out in H of the device described in FIG. 4 is applied to the base of a transistor $T_{23}$ polarized by the resistors $R_{70}$ to $R_{73}$ connected between a grounded line $L_{10}$ and a line $L_{11}$ having a voltage of $-10$ v. To the collector of the transistor $T_{23}$, is obtained a chopped signal, represented in FIG. 25. This signal is detected by an assembly comprising two diodes, $D_5$, $D_6$, a resistor $R_{74}$ and two capacitors $C_{25}$, $C_{26}$. The detected signal, whose shape is presented in FIG. 25 is applied, by the line I, as it will be hereinafter shown, on one hand, at the input of the video frequency amplifier 28, and on the other hand, by means of a resistor $R_{75}$, to the base of a transistor $T_{24}$ forming with the transistor $T_{25}$ a polarized flip-flop arrangement through the resistors $R_{76}$ to $R_{80}$. To the collector of the transistor $T_{25}$ (FIG. 27), it is obtained a negative pulse of a duration equal to the passage duration of the 5 kHz. signal (FIG. 27); this pulse is differentiated by an assembly $C_{26}$, $R_{81}$, $R_{82}$ and its front side is chopped by a diode $D_7$ while its rear side may pass. The signal presented in FIG. 28, is applied to the base of a transistor $T_{26}$ which forms with a transistor $T_{27}$ a monostable multivibrator, polarized by the resistors $R_{82}$ to $R_{87}$ and a capacitor $C_{27}$. At the collector of the transistor $T_{26}$, it is therefore obtained on the rear side of the unblocking signal, a pulse of a duration of 0.1 second (FIG. 26), which is sufficient to actuate a control relay $R1_2$ of the electromagnet 10 for a one step movement of the machine 5 carrying the subtitle strip 1. The relay $R1_2$ comprises a normally opened contact $R1_2'$ which connects the line I to the ground which results into the blocking of the video frequency amplifier 29 during the feeding of the subtitles.

This relay $R1_2$ is located in the collector circuit of a transistor $T_{29}$ (FIG. 31) polarized by resistors $R_{88}$, $R_{89}$, the said transistor being itself influenced by the signal present at the emitter of a transistor $T_{28}$ polarized by a resistor $R_{90}$ to the base of which is applied, through an assembly comprising a capacitor $C_{28}$, a resistor $R_{90}$ and a diode $D_8$, the signal coming out of the flip-flop arrangement $T_{26}$, $T_{27}$.

The diode $D_9$ which is located in the circuit of the collector of the transistor $T_{29}$ has the function to eliminate the voltage peak due to the self-induction of the relay $R1_2$.

4. VIDEO FREQUENCY AMPLIFIER
(FIGS. 32 TO 52)

One object of this amplifier is to let the subtitle pass during a predetermined period by the device described in part 2 of the present description, to electronically frame the subtitle, and last to extract from the video signal of the vidicon camera 1, a signal claimed from its subtitle.

To this effect (see FIG. 32), the viewing signal as well as the composite synchronization signal coming from the camera, brought by a line J, is applied on a separation stage comprising a transistor $T_{30}$, capacitors $C_{35}$, $C_{36}$ and resistors $R_{100}$ to $R_{103}$ connected a grounded line $L_{15}$ and a line having a voltage of $-10$ v., at the input of a bridge formed by diodes $D_{10}$ to $D_{13}$. The diodes $D_{10}$ to $D_{13}$ are polarized, on one hand, by resistors $R_{104}$, $R_{105}$, a diode $D_{14}$ and the resistors $R_{107}$, $R_{106}$, $R'_{105}$, $R''_{105}$, $R_{110}$ connected between the line $L_{15}$ and two lines $L_{17}$, $L_{18}$ having a voltage of $-24$ v. and on the other hand by a resistor $R_{108}$ and a diode $D_{15}$, the resistors $R_{109}$, $R_{110}$, $R_{105}$, a capacitor $C_{37}$ and resistors $R_{115}$, $R_{116}$.

In the other hand, the signal I coming from the control feeding device of the subtitles (part 3 of the represent description) and which comprises the negative pulses whose duration is function of the reading time of the subtitle, is applied to the base of the transistor $T_{31}$ forming with a transistor $T_{32}$ and the resistors $R_{111}$ to $R_{114}$, a flip-flop arrangement. The reverse polarization signals coming out on the collectors of the transistors $T_{31}$, $T_{32}$ with the negative pulses at the base of the transistor $T_{31}$ respectively block the diodes $D_{14}$, $D_{15}$, in such a way that the diodes $D_{10}$ to $D_{13}$ conduct the current and let the signal present at the emitter of the transistor $T_{33}$ go through; this latter transistor polarized by a resistor $R_{116}$ is connected as a common collector so as to influence the following stage with a low output impedance. The signal present at the emitter of the transistor $T_{33}$ is transmitted through an assembly $R_{117}$, $C_{38}$ to the base of a transistor $T_{34}$ associated to a transistor $T_{35}$.

The base of the transistor $T_{34}$ is connected to a fixed and permanent polarization assembly of a black level restitution assembly (clamping), which acts on the rear side of each horizontal synchronization pulse, to bring the base of the transistor to a fixed potential, whatever is the video signal amplitude.

The clamping pulses are generated in the following manner: the composite synchronization signal which enters in the video frequency amplifier by a line K is applied to the base of a transistor $T_{36}$ after being differentiated by an assembly $C_{39}$, $R_{118}$. Only the differentiated rear side of the synchronization signal appears reversed to the collector of the transistor $T_{36}$ (see FIGS. 33, 34, 35). This signal is integrated by an assembly $C_{40}$, $R_{119}$ and applied through an assembly $C_{41}$, $R_{120}$, to the base of a transistor $T_{37}$, polarized by a resistor $R_{120}$. When the transistor $T_{37}$ receives the negative sign pulse of the transistor $T_{36}$, it leads the current and momentarily grounds the signal coming from the transistor $T_{33}$ through the capacitor $C_{42}$ and a grounded line $L_{19}$. A voltage divider comprising a resistor $R_{121}$ and a potentiometer $P_{15}$ enables to adjust the level of the continuous signal coming from the transistor $T_{37}$.

The viewing signal applied to the transistor $T_{34}$ cannot go further in the video frequency amplifier than during the blocking periods of the transistor $T_{35}$. These periods form an electronic frame for the subtitle in function of the vertical synchronization signal and in function of the horizontal synchronization signal. The electronic frame is determined in function of the geometric placing of the subtitle in view of the camera.

The electronic frame is constituted in the following manner:

On one hand, the vertical synchronization signal is applied, after differentiation by an assembly constituted by $R_{122}$, $C_{43}$, $P_{16}$ at the base of a transistor $T_{36}$ forming with a transistor $T_{37}$ and resistors $R_{123}$ to $R_{127}$ as well as the capacitor $C_{44}$, a monostable multivibrator which reacts to the rear side of the vertical synchronization pulse. The signal present at the collector of the transistor $T_{36}$ (FIG. 37) is differentiated by an assembly $R_{128}$, $R'_{134}$, $C_{45}$ and applied to the base of a transistor $T_{38}$ forming with a transistor $T'_{38}$ and resistors $R_{129}$ to $R_{134}$ as well as the capacitor $C_{46}$, a monostable multi-vibrator which reacts on the rear side of the negative rectangular pulse for a duration of 13 msec. coming out of the collector of the transistor $T_{36}$. At the collector of the transistor $T_{38}$, there is a signal whose shape is represented by FIG. 38, presenting 15 msec. computed from the rear side of the vertical synchronization pulse, a negative pulse of 3 msec. which determines the height of the viewing signal or the video signal of the title if the scanning grid of a monitor is considered. This collector signal of the transistor $T_{38}$ is applied by means of a liaison capacitor $C_{47}$ and a resistor $R_{136}$, to the base of a transistor $T_{39}$.

On the other hand, the composite synchronization signal coming from the line K, and of which only the horizontal synchronization pulses are used, is applied after chopping, amplification and differentiation by the elements comprising an assembly $C_{48}$, $R_{137}$, a transistor $T_{40}$, a resistor $R_{138}$ and an assembly $C_{49}$, $R_{139}$, $R_{140}$ to the base of a transistor $T_{41}$ forming with a transistor $T_{42}$ and resistors $R_{141}$ to $R_{144}$ as well as a capacitor $C_{50}$, a monostable multivibrator which reacts on the rear side of the horizontal synchronization pulse. The signal present at the collector of the transistor $T_{42}$ (FIG. 59) is differentiated in the assembly $C_{51}$, $R_{146}$, $P_{17}$ and applied to the base of a transistor $T_{42}$ of the n.p.n. type which forms with a transistor $T_{43}$ of the n.p.n. type, the potentiometer $P_{17}$, the resistors $R_{146}$ to $R_{151}$, a monostable multivibrator which reacts on the rear side of the positive rectangular pulse having a duration of 9 $\mu$sec. coming out of the monostable multivibrator $T_{41}$, $T_{42}$. At the collector of the transistor $T_{44}$ there is a signal whose shape is represented in FIG. 40, presenting 9 $\mu$sec. computed from the rear side of the horizontal synchronization pulse, a negative pulse of a duration of 42 $\mu$sec. which determines the passage in length, when the scanning grid of a monitor is considered, of a video signal of the subtitle. This signal of the collector of the transistor $T_{44}$ is applied, through a liaison capacitor $C_{53}$ and a resistor $R_{137}$ to the base of a transistor $T_{45}$, the signal being of the shape shown in FIG. 41.

The function of the transistors $T_{39}$, $T_{45}$ is to mix the above-mentioned signals called opening signals. These transistors are coupled in cascade, in such a way that the applied pulses to the base of the transistor $T_{39}$ do not block this transistor during the unblocking periods of the transistor $T_{45}$; the mixed opening signal present at the emitter of the transistor $T_{39}$ is applied through a liaison circuit comprising a capacitor $C_{54}$ and a resistor $R_{138}$ to a chopping transistor $T_{46}$, polarized by the resistors $R_{139}$, $R_{140}$, $C_{65}$, at the collector of which the mixed opening signal presents the shape shown in FIG. 42. This signal is applied to the base of the transistor $T_{35}$ (FIG. 43) polarized by the resistors $R_{141}$ to $R_{143}$ in such a way that in the presence of the mixed opening pulse, this transistor $T_{35}$ blocks itself while the transistor $T_{34}$ opens, therefore producing the passage of the clamped viewing signal present at the base of the transistor $T_{34}$, towards a transistor $T_{47}$.

Figure 47:
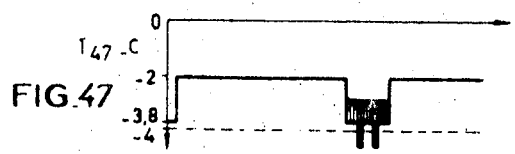
Figure 48:
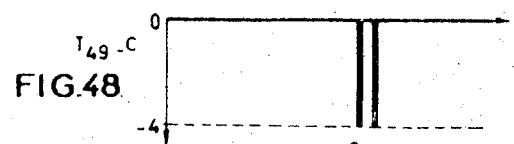
Figure 49:
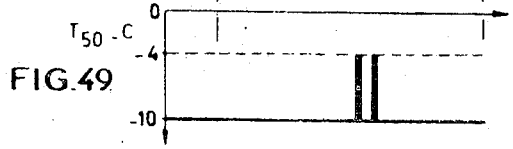
Figure 50:
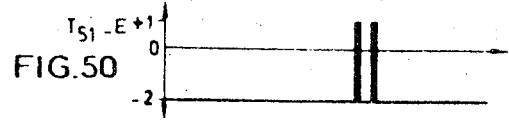
Figure 51:
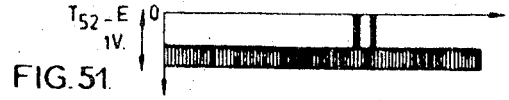

By referring to FIGS. 44 to 51, it may be noticed that for a two lines subtitle, the shape of the signals at the base of the transistor $T_{30}$ comprising the viewing signals and the synchronization signals, the shape of the clamped signals at the base of the transistor $T_{34}$, the shape of the signals at the collector of the transistors $T_{34}$, $T_{35}$, only substituting the part of the clamped signal present during the unblocking period of the transistor $T_{34}$. This signal is amplified in the transistor $T_{37}$ and chopped in the black part (reversed signal) by a diode $D_{16}$ polarized by the resistors $R_{145}$, $R_{146}$, $R_{147}$ as shown in FIG. 47. The signal will now be amplified and chopped in the white part after the passage in a separation transistor $T_{48}$ polarized by the resistors $R_{146}$ and $R_{147}$ by a transistor $T_{49}$ in the collector circuit of which is inserted a gain adjustable potentiometer $P_{16}$; the chopping level in the white parts is adjusted by a potentiometer $P_{19}$ inserted in the polarization circuit of the base of the transistor $P_{49}$, between the resistors $R_{149}$ and $R_{150}$. The signal present at the collector of the transistor $T_{49}$, shown in FIG. 48, is applied to an amplifier stage comprising the transistors $T_{50}$, $T_{51}$ as well as the resistors $R_{151}$ to $R_{155}$ and a capacitor $C_{56}$ (see FIGS. 49, 50).

The signal present at the emitter of the transistor $T_{51}$ is applied at the base of an output transistor $T_{52}$ whose charging elements comprise a resistor $R_{157}$, a capacitor $C_{57}$ and resistors $R_{161}$, $R_{162}$.

In order to join the outgoing viewing signal to the synchronization signal, the composite synchronization signal which enters in the line K, is applied, through an assembly $R_{158}$, $R_{159}$, $C_{58}$ to the base of a separation transistor $T_{53}$ and retaken at the emitter of this transistor $T_{53}$ from where it is added, by a passive mixture, comprising a capacitor $C_{59}$ and resistors $R_{160}$, $R_{161}$, $R_{162}$ to the viewing signal present at the emitter of the transistor $T_{52}$. The output signal of the video frequency amplifier, present in the line M, presents the shape shown in FIG. 51.

In FIG. 52, a block diagram represents the different essential stages of the video frequency amplifier. The reference character 100 identifies the generation stage of the line opening signal, (opening of the transistor $T_{45}$) the said stage comprising mainly of the monostable multivibrators having the transistors $T_{41}$, $T_{42}$, and $T_{43}$, $T_{44}$; the reference number 101 designates the generating stage of the scanning opening signal (opening of the transistor $T_{39}$), the said stage comprising mainly the monostable multivibrators having transistors $T_{36}$, $T_{37}$ and $T_{38}$, $T_{39}$; the opening signals are mixed in the mixing stage 102 comprising the transistors $T_{39}$, $T_{45}$ and $T_{34}$, $T_{35}$ at the entrance of which is, on the other hand, outlined in 104 the clamped visual signal during the determined period in function of the reading time determination device; the viewing signal is brought to an output stage 105 comprising chopping elements in the black and white parts, having transistors and diodes $T_{47}$ to $T_{49}$, $D_{16}$ from where it is brought from the stage 105 on one hand in the line 30 towards the distribution amplifier for the cleaned subtitle 35 and, on the other hand, in the line 29 towards the atuomatic determination device for the reading time of the subtitles.

The reference character 106 designates the scanning grid of a monitor. The signal 107 represents the horizontal scanning signal and the signal 108 represents the line opening signal, while the signal 109 represents the vertical scanning signal and the signal 110 represents the raster opening signal; the intersection of the opening pulses on the grid delimits a rectangle 111 which represents, in the time, the limits of the electronic frame of the subtitle.

5. "SUBTITLE-PROGRAM" MIXING DEVICE (FIGS. 53 to 57)

It must be pointed out first that the installation described applies a positive modulation of the high frequency signal, and then that the letters of the subtitle seen on the monitor are white.

The device enables to obtain first, during predetermined periods, the substraction of the "subtitle" viewing signal (video signal) from the "program" video signal. The result of this substraction as seen on a monitor gives a picture with a black subtitle.

The device enables to obtain also the addition of the totality of the subtitle video signal after this signal has been delayed by 0.2 $\mu$sec. The device enables to obtain finally the retardation of 0.2 $\mu$sec. or of a duration equal to the time spent between the front side of a signal pulse corresponding to a black subtitle and the front side of a signal pulse corresponding to a white subtitle, the rear side of the signal pulse corresponding to a black subtitle.

The result of these two operations as seen on a monitor gives a picture where the vertical part of each letter is preceded by a black band of a width corresponding to 0.2 μsec.

To this effect, the "program" composite video signal, that is, the signal comprising the "program" video signal and the synchronization signals, is applied from a line V to an amplifier-separator transistor $T_{54}$ whose polarization and charging elements comprise resistors $R_{164}$ to $R_{168}$ and the capacitors $C_{60}$, $C_{61}$.

The signal present at the emitter of the transistor $T_{54}$ is periodically clamped to a determined voltage by a resistor $R_{169}$, $P_{20}$, $R_{170}$ through a diode bridge $D_{20}$ to $D_{23}$.

The opening of the diode bridge $D_{20}$ to $D_{23}$ is determined by the composite synchronization signal which enters by a line O and is applied to a chopping transistor $T_{55}$ whose polarization and charge elements comprise resistors $R_{171}$ to $R_{176}$, $C_{62}$ to $C_{64}$, $D_{24}$. The signal present at the collector of the transistor $T_{55}$, which is reversed, compared to the one at the input, is differentiated by the assembly $C_{64}$, $R_{176}$, the diode $D_{24}$ chopping the positive peaks of the differentiated synchronization signal. The negative peaks which correspond to the rear side of the synchronization signal are applied to the base of a transistor $T_{56}$ whose polarization and charge elements particularly comprise the resistors $R_{177}$ to $R_{181}$, capacitors $C_{65}$ to $C_{67}$ and a diode $D_{25}$. At the collector of a transistor $T_{56}$, there appear positive pulses corresponding to the rear side of the synchronization signal. These pulses are slightly integrated by the capacitor $C_{65}$ and polarized by the assembly $D_{25}$, $C_{67}$, $R_{179}$, $R_{180}$, $R_{181}$ in such a way as to align all the applied pulses to the base of the transistor $T_{57}$ to a determined voltage, herein set at $-5$ v. by the voltage divider $R_{179}$, $R_{180}$, to which is connected the cathode of the diode $D_{25}$. At the emitter and at the collector of the transistor $T_{57}$, pulses of amplitude which is equal and in opposite phase, the said impulses being delayed in view of the synchronization pulse. Between the emitter and the collector of the transistor $T_{57}$, is inserted a phase correction assembly comprising elements $C_{68}$, $C_{69}$, $R_{177}$. These pulses are applied through the capacitors $C_{70}$, $C_{71}$ to the diode bridge $D_{20}$ to $D_{23}$ in such a way that in the presence of pulses, the bridge switches over the base of the transistor $T_{58}$, on the potentiometer $P_{20}$ and "clamps" the signal at the base of the transistor $T_{58}$ on the rear side of the horizontal synchronization pulses. The resistors $R_{184}$ to $R_{187}$ improve the symmetry of the diode bridge $D_{20}$ to $D_{23}$ and reduce the clamping residues.

The clamped signal is amplified in the transistors $T_{58}$, $T_{59}$ whose polarization and charge elements comprise resistors $R_{188}$ to $R_{190}$ and capacitors $C_{74}$, $C_{75}$, the assembly $C_{75}$, $R_{190}$ constituting a high-pass filter.

To the clamped signal "program+synchronization" having positive pulses and being brought to the base of the transistor from $T_{60}$, is superposed a signal coming from the emitter of a transistor $T_{60}$ which constitutes the output transistor of a stage which will be later examined in details. It is sufficient to know now that the signal present at the emitter of the transistor $T_{61}$ comprises negative pulses whose front side is located timewise at the level of the beginning of the subtitle video signal in such a way that it comes out through the line U of the video frequency amplifier 28 and whose rear side is delayed by 0.2 μsec. in view of the end of the subtitle video signal. At the base of the transistor $T_{60}$, there is a combined video signal+a synchronization signal corresponding to a picture mixed with black subtitles (blanking).

This amplified signal is found at the emitter of the transistor $T_{60}$. The resistors $R_{191}$, $R_{192}$ as well as the condensers $C_{76}$ constitute charge elements of the transistor $T_{60}$, the assembly $R_{192}$, $C_{76}$ constituting a high-pass filter. To the hereinabove mentioned signal taken at the emitter of the transistor $T_{60}$ is superposed a signal coming from a line Q of a stage which will be later examined in details. It is now sufficient to know that the signal present in the line Q corresponds to the subtitle video signal whose front side is delayed by 0.2 μsec. The mixed signal is applied to the base of a transistor $T_{62}$ through a capacitor $C_{77}$ and resistors $R_{193}$, $R_{194}$. The transistor $T_{62}$ forms with a transistor $T_{63}$ a feed-back amplifier through an assembly $R_{194}$, $C_{78}$, and the elements $R_{195}$ to $R_{205}$, the potentiometer $P_{21}$ and the capacitor $C_{79}$ to $C_{82}$, the assembly $C_{81}$, $R_{198}$ constituting a low-pass filter and the assembly $C_{78}$, $R_{194}$ a high-pass filter, the potentiometer $P_{21}$ setting the rate of feed-back and consequently the total amplification.

The amplified mixed signal is applied to the output stage comprising transistors $T_{64}$, $T_{65}$ and the polarization and charge elements $R_{202}$ to $R_{205}$ and $C_{83}$ which constitute a constant frequency response amplifier. The mixed signal is available in an output line S.

The mixed signal available in the output line S is diagrammatically shown in FIG. 54. The full-line designates the video signal 116; composite program. The levels $V_1$, $V_2$ and $V_3$ respectively corresponding to the infra-black to the black and to the white. The "clamping" is produced on the rear side 111 of the horizontal synchronization signals 112. At the time $t$, the blanking signal 113 (dotted lines) starts and 0.2 μsec. later at $t_2$ the "subtitle" video signal 114 (dot-and-dash line) starts whose rear side 115 blends with the rear side 116 of the blanking signal.

By referring to FIG. 55, it will now be described how to obtain the signal applied, on one hand, to the transistor 61 for the blanking formation and, on the other hand, to the line Q for the delayed "subtitle" video signal.

The positive modulation "subtitlte+synchronization" video signal is applied by the output line M of the video frequency amplifier, to the base of a transistor $T_{66}$ separator amplifier, whose charge elements comprise resistors $R_{206}$ to $R_{211}$ and capaictors $C_{84}$, $C_{85}$. The signal present at the emitter of the transistor $T_{66}$ is applied to the base of a transistor $T_{67}$ forming with the transistors $T_{68}$, $T_{69}$ and their charge and polarization elements, $R_{212}$ to $R_{221}$, the potentiometer $P_{22}$, $P_{23}$ and the capacitors $C_{89}$ a high and low chopping amplifier, the chopping limits being fixed by the potentiometers $P_{22}$, $P_{23}$. To the collector of the transistor $T_{69}$, the output of the chopped subtitle signal is obtained going in a negative direction and which is applied through the elements $C_{50}$, $R_{222}$, $R_{223}$ to the base of an inverter amplifier transistor $T_{70}$. The elements $R_{224}$, $C_{91}$, $R_{225}$, $C_{92}$ are respectively high frequency compensation and polarization assemblies. The signal present at the collector of the transistor $T_{70}$, of constant amplitude, is applied, on one hand, to the base of a separation transistor $T_{71}$ whose gain is adjustable by a potentiometer $P_{24}$ from where, by a line V and through an integrator circuit $C_{95}$, $R_{226}$, $R_{227}$, it is brought (see FIG. 53) to the base of the transistor $T_{61}$. The purpose of the integrator circuit is to prolong the duration of the pulse applied at the base of the transistor $T_{61}$ by 0.2 μsec., that is by a duration equal to the time which is spent between the front side 113 of the said pulse and the front side 114 (see FIG. 54) of the delayed pulse corresponding to the white subtitle.

In these conditions, the transistor $T_{61}$, which is normally blocked, is polarized in saturation in the presence of a pulse applied to its base, that is, in the presence of the signal corresponding to a letter and short circuits the video-program signal at a negative voltage reference corresponding to the black level, obtained by the voltage divider $R_{169}$, $P_{20}$, $R_{170}$.

The signal present at the collector of the transistor $T_{70}$ is on the other hand applied through a capacitor $C_{96}$ and resistors $R_{228}$, $R_{229}$ at the base of a separation transistor $T_{72}$. From the emitter of the transistor $T_{72}$, the signal is applied to a delay line of 0.2 μsec. in which are inserted the resistors $R_{230}$, $R_{231}$ and a potentiometer $P_{25}$ which sets the amplitude of the signal applied to the base of a separation transistor $T_{73}$, from which with the same positive polarity it is superposed through a resistor $R_{232}$, and insulation capacitor $C_{97}$ and the line Q in the liaison between the transistor $T_{60}$, $T_{62}$, to the clamped composite video signal "program+synchronization" on which has already been superposed and the blanking signal.

For the formation of the subtitles whose letters seen on the grid of the monitor present a black band on each side, it is sufficient to prolong, in view of the hereinabove stated conditions, the blanking signal (the signal corresponding to a subtitle whose letters seen on a monitor would be black) for a period of time equivalent to the width of the desired black band, for example of 0.2 $\mu$sec. To this effect, the signal present at the collector of the transistor $T_{70}$ (see FIG. 55) and which illustrates the "subtitle" video signal which is chopped and has a constant amplitude, is applied (see FIG. 56), on one hand, to the base of a transistor $T_{74}$ whose polarization and charge elements comprise the capacitor $C_{18}$ resistors $R_{236}$, $R_{237}$ and two delay lines 118, 119, each of 0.2 $\mu$sec. At an intermediate connection between the delay lines 118, 119, the white signal of the subtitle, delayed by 0.2 $\mu$sec., is retaken and superposed, via a separation transistor $T_{75}$, the charge elements $R_{238}$, $R_{239}$ and $C_{99}$ and a line Q' in the liaison between the transistors $T_{60}$ and $T_{62}$ to the "program+synchronization" composite video signal on which has already been superposed the blanking signal. The latter is obtained in the following manner:

The signal present at the collector of the transistor $T_{70}$ is, on one hand, applied to the base of a separation transistor $T_{76}$, whose polarization and charge elements comprise the capacitors $C_{100}$, $C_{101}$ and the resistors $R_{240}$ to $R_{244}$. From the emitter of the transistor $T_{76}$, the signal is applied to the base of a transistor $T_{77}$ whose emitter has a common load resistor, $R_{245}$ with the emitter of a transistor $T_{78}$ to the base of which is applied a "subtitle" video signal delay of 0.4 $\mu$sec., coming from the end of the complete delay line, via a separation transistor $T_{79}$ and an assembly comprising a capacitor $C_{102}$ as well as the resistors $R_{247}$, $R_{248}$. The transistors $T_{77}$, $T_{78}$ mix the signals applied at their base, which have the same sign but are mutually out of phase by 0.4 $\mu$sec. The mixed signal is applied through a capacitor $C_{103}$, to the base of a chopping transistor $T_{80}$ whose chopping level is adjustable by means of a potentiometer $P_{26}$ inserted in the polarization circuit of the base of this transistor $T_{80}$. To the collector of the transistor $T_{80}$, there is at every pulse of the letter, a pulse positively directed whose front and rear sides are respectively advanced by 0.2 $\mu$sec. and delayed by 0.2 $\mu$sec. in view of the front and rear sides of the pulse corresponding to the white letter and which is present in the line Q'. The signal of the collector of the transistor $T_{80}$ is applied, through an insulation stage comprising a transistor $T_{81}$, a resistor $R_{252}$, a capacitor $C_{104}$ and a line V towards the integration stage $C_{95}$, $R_{227}$, $R_{226}$ and the transistor $T_{61}$ (FIG. 55) starting from which the reversed and prolonged signal is superposed to the "program+synchronization" composite video signal to the base of the transistor $T_{60}$.

In FIG. 54', it has been illustrated the mixed signal available in the output line S when the circuit according to FIG. 55 is applied. This signal differentiates from the signal represented in FIG. 54 only by the fact that the rear side of the blanking pulse 116 is delayed by 0.2 $\mu$sec.

It is clear that by modifying slightly the circuit according to FIGS. 53, 55, it is possible to obtain subtitles seen on a grid of a monitor only with white letters or only with black letters or with white letters having black edges on the right hand side only. In the first case, it will be sufficient not to use the delay line 117 (FIG. 55) and to suppress the integration assembly $C_{95}$, $R_{227}$, $R_{226}$; in to second case, it will be sufficient to open the line Q and to suppress the integration assembly $C_{95}$, $R_{227}$, $R_{226}$. In the third case it will be sufficient not to use the delay line 117 so as not to delay the substile video signal aimed to form the signal positively directed of the subtitle and to prolong the subtitle video signal aimed to form the signal negatively directed (blanking signal).

In FIG. 57, a block diagram is represented corresponding to the mixing device described in the present chaper.

T triple pole triple throw switch (180, 180', 180") when in the position 181, 181', 181", provides the mixing "program-subtitle" with white letters having black edges on the left side; in the position 182, 182', 182", the mixture with white letters having black edges on the right and left sides, in the position 183, 183', 183", the mixture with white letters having black edges on the right side, in the position 184, 184', 184", the mixture with black letters without any edges; in the position 185, 185', 185", the mixture with white letters without edges.

The reference characer 186 designates the chopping amplifier stage of the "subtitle" video signal, the said stage comprising particularly the transistors $T_{66}$ to $T_{70}$, which signal is brought by the line 187 (line K of FIG. 32) from the video frequency amplifier by means of the distribution amplifier 35. The reference characters 188, 189 designate the 0.2 $\mu$sec. delay stages.

The "subtitle" video signal which is amplified and chopped is brought according to the position of the switch 181 directly towards the black pulses generator having an adjustable width 190, comprising particularly transistors $T_{71}$, $T_{61}$ or $T_{76'}$, $T_{77}$, $T_{78}$, $T_{80}$, $T_{81}$ and the capacitor $C_{95}$ as well as after having been delayed in one or in the two delay stages 188, 189 at the "white" pulse generator 194 comprising particularly the transistor $T_{73}$ or $T_{75}$, these two pulses adapted to be mixed in the stages 191, 193 comprising particularly the transistors $T_{60}$, $T_{62}$ with the "program+synchronization" composite video signal brought to the mixer 191 after having been periodically clamped according to the clamping pulses generation in the stage 192 to which is applied the composite synchronization signal by a line 192 (line C in FIG. 13) and comprising particularly transistors $T_{55}$ to $T_{57}$ and the diode bridge $D_{20}$ to $D_{23}$. The mixed composite signal "program+subtitle+synchronization" is present in the line 42.

It should be well understood that the invention is not limited to the described example and that many modifications may be brought without changing the embodiment of the present invention.

It is particularly pointed out that the transistor circuits may be replaced by electronic tubes.

We claim:

1. An installation for producing subtitles on television programs, comprising:
   a support for the subtitle constituted by a paper strip on which the subtitle is printed;
   a motor for driving said strip;
   an emitter of control signals controlling said motor,
   a camera viewing said strip;
   a camera control unit transmitting to the camera composite synchronization signals and horizontal and vertical scanning signals;
   a first amplifier connected to said camera control unit for the transmission of the signal produced by the camera;
   a gating circuit assembly connected to said first amplifier and having inputs for the composite synchronization signals for the vertical scanning signal and for an unblocking signal transmitted by said emitter of control signals, said unblocking signal determining the reading time of the subtitle;
   a second amplifier connected to said gating circuit assembly; and
   a program-subtitle mixing assembly connected to said second amplifier and having a further input for the video signal of the program, the output of said program-subtitle mixing assembly being transmitted to a final communication center.

2. An installation for producing subtitles on television programs as claimed in claim 1 wherein said gating assembly comprises:
   a generation stage of a line opening signal controlled by the composite synchronization signals:

a generation stage of a scanning opening signal controlled by the vertical scanning signal;

a mixer for said opening signals and the clamped video signal coming from said camera, said mixer comprising two gates in series, the video signal coming from the camera being connected to the input of the first of said gates, said first gate being unblocked during the said opening pulses, the second of said gates being unblocked during the simultaneous presence of the two said opening pulses generated respectively according to one pulse per raster and one pulse per line; and an output stage.

3. An installation for producing subtitles on television programs as claimed in claim 1 wherein said program-subtitle mixing assembly comprises:

an amplifier stage of the video signal coming from said camera;

a delay line having differently delayed outputs connected to said amplifier stage;

a black pulses generator connected selectively to one of said differently delayed outputs;

a white pulses generator connected selectively to another of said differently delayed outputs; and a mixing device fed by the outputs of said black and white pulses generators and by the composite program video signal.

4. An installation as recited in claim 3, wherein the program-subtitle mixing assembly comprises a clamping polarization assembly on a level on the rear side of the horizontal synchronization pulses following the program video signal in front of the mixing device.

5. An installation as recited in claim 3, wherein the mixing device comprises a transistor on the base of which is applied the program video signal and the subtitle video signal with pulses having a sign opposite the installation modulation sign, the output circuit of the said mixing device receives the subtitle video signal with pulses having a sign corresponding to the installation modulation.

6. An installation as recited in claim 3 comprising a multi-pole switch connected between the differently delayed outputs, the black pulses generator and the white pulses generator.

7. An installation for producing subtitles on television programs as claimed in clain 1 comprising further:

a limiter connected to said gating assembly producing pulses with duration corresponding to the length of the letters of the subtitle;

an integration stage connected to said limiter measuring the total length of said pulses;

a sawtooth generator controlled by the vertical scanning signal and by the output of said integration stage; and an electronic contactor controlled by said pulse generator; said contactor controlling said emitter of control signals.

8. An installation for producing subtitles on television programs as claimed in claim 7 comprising:

a video-pulse generator connected selectively to a manually operated contactor or to the said electronic contactor; and a gate controlled by said video-pulse generator and connecting a generator of a 5 kHz. signal to the said emitter of control signals, the duration of connecting said generator to said emitter determining the duration of the said unblocking signal transmitted by the emitter of control signals.

9. An installation as recited in claim 8, wherein between the gate of the periodical signal and the emitter of control signals, is connected a plurality of switches, a first switch adapted in a closed position to maintain the connection between the gate of the periodical signal and emitter of control signals, a second switch when in a closed position, adapted to maintain the said connection between the gate of the periodical signal and a magnetic registration assembly, and a third switch, when in a closed position, adapted to maintain a third connection between the magnetic reproduction assembly and the emitter of control signals.

10. An installation as recited in claim 8 wherein the emitter of control signals comprises a monostable multivibrator responsible on the rear side of the pulses having a steep slope, formed by unblocking pulses and in phase with the latter, the pulses coming out of the said monostable multivibrator being transmitted to the excitation circuit of a relay to control the motor driving the strip.

11. An installation as recited in claim 8, wherein the contactor establishes, in the closed position, the charge circuit of a capacitor inserted in the control circuit of the said gate and ensuring, when it is charged, the opening of the said gate, the charge circuit of the capacitor comprising an electronic switch, such as a transistor, on which are applied repetition pulses of a duration variable in function of the length of the subtitle, the duration of the said repetition pulses being inversely proportional to the length of the subtitle, in such a way that for a short subtitle, the discharge of the said capacitor will be faster and vice versa.

12. An installation as recited in claim 8, wherein the contactor establishes, in the closed position, the discharge circuit of a capacitor normally charged the said discharge circuit comprising a relay having a coil and a contact, the said contact normally opened, establishes, in the closed position, the charge circuit of the capacitor inserted in the control circuit of the said gate.

13. An installation as recited in claim 8, comprising a reversing relay inserted in the control circuit of the said gate in front of the contactor, the said reversing relay being of the double-pole type, one of the poles being inserted in a control circuit of the gate while the other pole is inserted in the circuit of the relay.

14. An installation as recited in claim 7 wherein the integration stage comprises a first capacitor on which accumulates during the duration of each raster, the charge coming from the said limiter, the capacitor eliminating at least a part of its charge through a first electronic switch such as a transistor closed during the vertical synchronization pulses, on a second capacitor whose charge determines the value of the continuous voltage of the saw-tooth signal.

15. An installation as recited in claim 14, wherein the integration stage comprises a voltage limiting assembly at the terminals of the first capacitor, this assembly comprising a diode and a potentiometer for setting the polarization of the diode.

16. An installation as recited in claim 15, wherein the integration stage comprises a first potentiometer for adjusting the time constant of the first capacitor.

17. An installation as recited in claim 16, wherein the sawtooth signal is applied to the base of a first transistor having a common charge resistor with a second transistor in the polarization circuit of the base on which is inserted on, one hand, the said second capacitor and, on the other hand, an adjustable potentiometer.

18. An installation as recited in claim 17, wherein the integration stage comprises a second electronic switch connected in series with the first electronic switch, the said second electronic switch being momentarily closed by a pulse generated by delay elements starting from the vertical synchronization pulse, the said second electronic switch being connected between the said first capacitor and a grounded line.

19. An installation as recited in claim 1, further comprising a drum driven by said motor for moving said strip in front of a camera and wherein the drum has a drawer having two compartments constituting feeding and receiving magazines for the strip when the said strip moves in front of a camera.

20. An installation as recited in claim 1, comprising two monitors, the first monitor being connected at the output of the program-subtitle mixing assembly, the second monitor receiving the subtitle viewing signal.

21. An installation as recited in claim 20, comprising in front of the second monitor a reversing switch connected in two communication lines, one of said lines connecting the monitor to the said gating circuit assembly and the other line connecting the monitor to the camera.

22. An installation as recited in claim 7, wherein the sawtooth signal, after being fixed to the continuous voltage level, is applied to a bistable multivibrator providing a pulse of equal frequency and of a width which is shorter as the signal is longer.

References Cited

UNITED STATES PATENTS 2,934,601   4/1960   Oppenheimer ———— 178—6.8

ROBERT L. GRIFFIN, Primary Examiner

ROBERT L. RICHARDSON, Assistant Examiner

U.S. Cl. X.R.

178—5.6, 7.1